(12) United States Patent
Edmiston

(10) Patent No.: US 9,817,784 B2
(45) Date of Patent: Nov. 14, 2017

(54) MULTI-PORT TRANSMITTER DEVICE FOR TRANSMITTING AT LEAST PARTLY REDUNDANT DATA, AN ASSOCIATED CONTROL SYSTEM, AN ASSOCIATED METHOD AND AN ASSOCIATED COMPUTER PROGRAM PRODUCT

(71) Applicant: Graham Edmiston, Bridge of Weir (GB)

(72) Inventor: Graham Edmiston, Bridge of Weir (GB)

(73) Assignee: NXP USA, Inc., Austin, TX (US)

( * ) Notice: Subject to any disclaimer, the term of this patent is extended or adjusted under 35 U.S.C. 154(b) by 248 days.

(21) Appl. No.: 14/778,126

(22) PCT Filed: Mar. 22, 2013

(86) PCT No.: PCT/IB2013/052306
§ 371 (c)(1),
(2) Date: Sep. 18, 2015

(87) PCT Pub. No.: WO2014/147453
PCT Pub. Date: Sep. 25, 2014

(65) Prior Publication Data
US 2016/0070669 A1 Mar. 10, 2016

(51) Int. Cl.
*G06F 13/40* (2006.01)
*G06F 13/38* (2006.01)
*G06F 13/362* (2006.01)

(52) U.S. Cl.
CPC ........ *G06F 13/4072* (2013.01); *G06F 13/362* (2013.01); *G06F 13/382* (2013.01)

(58) Field of Classification Search
CPC ... G06F 13/4072; G06F 13/382; G06F 13/362
See application file for complete search history.

(56) References Cited

U.S. PATENT DOCUMENTS 6,377,972 B1  4/2002 Guo et al.
6,496,740 B1  12/2002 Robertson et al.
(Continued)

OTHER PUBLICATIONS

Rentschler, M; Heine, H., "The Parallel Redundancy Protocol for industrial IP networks," Industrial Technology (ICIT), 2013 IEEE International Conderence, pp. 1404, 1409, Feb. 25-28, 2013.*
(Continued)

*Primary Examiner* — Tammara Peyton

(57) ABSTRACT

A multi-port transmitter device for transmitting at least partly redundant data is described. The multi-port transmitter device comprises at least two transmitters comprising respective transmitter buffers. One transmitter is a master transmitter that issues a request to the processor to provide a data block when the transmitter buffer of the master transmitter has free space to store a data block. The processor is arranged to copy at least one data block of data stored in an external memory from the external memory to respective positions in a local buffer. The processor is arranged to, in accordance with a predefined sequence, sequentially initiate transfer of the data block from the respective position of the data block in the local buffer to the transmitter buffers of the at least two transmitters in response to a request from the master transmitter to provide a data block.

17 Claims, 11 Drawing Sheets

(56) References Cited

U.S. PATENT DOCUMENTS

| | | |
|---|---|---|
| 7,573,916 B1 | 8/2009 | Bechtolsheim et al. |
| 7,649,912 B2 | 1/2010 | Balasubramanian et al. |
| 7,787,486 B2 | 8/2010 | Vestal |
| 7,817,650 B2 | 10/2010 | Page |
| 7,860,992 B2 | 12/2010 | Robinson |
| 8,582,424 B2 * | 11/2013 | Kirrmann ............. H04L 12/437 370/222 |
| 9,356,830 B2 * | 5/2016 | Angst ................. H04L 41/0668 |
| 2004/0013088 A1 | 1/2004 | Gregg |
| 2005/0276252 A1 | 12/2005 | Sizeland et al. |
| 2006/0268871 A1 | 11/2006 | Van Zijst |
| 2009/0180482 A1 | 7/2009 | Andreoletti et al. |
| 2011/0029687 A1 | 2/2011 | Kirrmann et al. |
| 2015/0138950 A1 * | 5/2015 | Ma ........................... H04L 1/22 370/223 |

OTHER PUBLICATIONS

International Search Report and Written Opinion correlating to PCT/IB2013/052306 dated Dec. 16, 2013.

* cited by examiner

MULTI-PORT TRANSMITTER DEVICE FOR TRANSMITTING AT LEAST PARTLY REDUNDANT DATA, AN ASSOCIATED CONTROL SYSTEM, AN ASSOCIATED METHOD AND AN ASSOCIATED COMPUTER PROGRAM PRODUCT

FIELD OF THE INVENTION

This invention relates to a multi-port transmitter device for transmitting at least partly redundant data, an associated control system, an associated method and an associated computer program product.

BACKGROUND OF THE INVENTION

Industrial control networks are one example of data communication systems wherein network nodes are attached to multiple communication networks to provide redundant communication between the network nodes.

As an example, the so-called Parallel Redundancy Protocol (PRP) is a data communication network standardized by the International Electrotechnical Commission as IEC 62439-3 Clause 4. PRP allows systems to overcome any single network failure without affecting the data transmission. Each network node of a PRP network has two Ethernet ports attached to two different local area networks (LANs). Each frame is substantially duplicated and sent substantially concurrently by a transmitting node over the two LANs. The PRP network may hereby provide redundant transmission over the two LANs. A receiving node can thus receive each frame via each of the two LANs and can process the frame that arrives first and discard the other. Herein, the receiving node may use the sequence number that is attached to each frame, and incremented for successive frames. PRP was developed to overcome any single network failure and to provide a high-availability network. In PRP, the duplicate frames as transmitted are identical apart from one or more bits of a so-called Redundancy Control Trailer (RCT) that comprises the sequence number of the frame, a network identifier and a frame size parameter. A frame may further be supplemented with a so-called Field Check Sequence (FCS) to provide a cyclic redundancy check. Destination address, source address, a so-called payload field comprising the data to be transmitted (hereafter referred to as information), sequence number and frame size parameter are identical between duplicate frames, whereas the network identifier and, if present, the FCS are different. As the frames are near to identical, such frames may further be referred to as plesio-identical frames. Similar protocols use parallel redundancy but comprise more non-identical fields, for example, not only differing by a limited number of bits in a trailer, but also differing by further control or status bits in a header. Such frames may further be referred to as quasi-identical.

For low baud rate communication, also UART-based field busses are used with networks with redundant communication. For example, the so-called Profibus (Process Field Bus) is a standard for field bus communication widely used in industrial process control and automation. In an exemplary Profibus communication system, an RS-485 UART is used as its physical layer. Herein, frame-oriented serial transmission over two different serial networks is used. In many Profibus systems, the frames transmitted over the different networks may be exactly identical.

Identical, plesio-identical and quasi-identical frames may further be referred to as redundant frames or as duplicate frames.

Transmission of duplicate frames may further be referred to as duplicast. Duplicast may be used in industrial control and automation as indicated above, as well as in, for example, automotive control systems, streaming audio or video, and other systems requiring reliable, non-interrupted communication. Other real-time systems may make a larger number of copies and concurrently transmit three or more copies via a corresponding number of different networks, Transmission of two, three or more copies via a corresponding number of different networks may further be referred to as multicast. Where the term duplicast is used in examples to described transmission over two networks, the skilled person will appreciate that the example may be extended to multicast transmission over more than two networks.

An exemplary prior art communications processor having a duplicast transmitter is schematically illustrated in FIG. 1a. FIG. 1a shows a communications processor UCP1 comprising a central processing unit (CPU) CPUP1 and a duplicast transmitter MPTDEVP1 for transmitting redundant data using a PRP protocol. The duplicast transmitter MPTDEVP1 comprises a processor RISCEP1, a local memory LOCMEMP1 comprising a first local buffer WA_MAC1 and a second local buffer WA_MAC2, a first transmitter EMAC1 and a second transmitter EMAC2 comprising respective transmitter buffers TxFIFO_MAC1 and TxFIFO_MAC2 and respective transmitter ports TPORTP1 and TPORTP2, and—in a variant of the prior art example—a hardware synchronization unit SYNCHW1. The transmitter ports TPORTP1 and TPORTP2 are connected to two different LANs LAN_1 and LAN_2. The transmitters EMAC1 and EMAC2 are arranged to transmit data buffered in the transmitter buffers TxFIFO_MAC1 and TxFIFO_MAC2 via the transmitter ports TPORTP1 and TPORTP2. The local memory LOCMEMP1 may also be referred to as work area. The first local buffer WAMAC1, the second local buffer WA_MAC2 and the transmitter buffers TxFIFO_MAC1, TxFIFO_MAC2 are implemented as cyclic First-In-First-Out (FIFO) buffers in local random access memory (RAM). In this example, the processor RISCEP1 is a reduced instruction set computing (RISC) processor.

The central processing unit CPUP1 and the duplicast transmitter MPTDEVP1 are connected to an external memory EXTMEMP1. The external memory EXTMEMP may be a DDR memory. The external memory EXTMEMP is used to store the data to be transmitted via each of the transmitters in two data buffers DBUF_MAC1 and DBUF_MAC2 in the external memory EXTMEMP.

The redundant transmission by the prior art communications processor UCP1 may be schematically illustrated with reference to numbers 1-8 shown in circles in FIG. 1a.

Based on the address and length of a frame stored in PRP format in the external memory at a position in the first data buffer DBUF_MAC1 in the external memory EXTMEMP1, the CPU CPUP1 generates a first descriptor DESCR_MAC1 pointing to the frame and stores the first descriptor in a first transmission queue TQP1 in external memory EXTMEMP1 in a first action 1. The descriptor DESCR_MAC1 may for example be in a format as schematically illustrated in FIG. 1b: the descriptor DESCR_MAC1 may comprise a status and control field DSTATCTRL, a data length DLEN indicating the length of the frame and a data address DPNT providing a pointer to a start address of the frame in the external memory. The status and control field DSTATCTRL may comprise a so-called buffer ready flag, indicating whether data is available at the respective position. Next, in a second action 2, the CPU CPUP1 copies the frame from the first data buffer DBUF_MAC1 in the external memory to a second data buffer DBUF_MAC2 in the external memory. If required, the CPU CPUP1 changes the content of the frame for the second transmitter in between reading the frame from the first data buffer DBUF_MAC1 and writing the frame to the second data buffer DBUF_MAC2. For example this changing may comprise modifying the content of the frame by modifying the network identifier in the RCT. Subsequently, in a third action 3, generates the corresponding descriptor DESCR_MAC2 and stores the second descriptor in a second transmission queue TQP2. Thus, after action 3, plesio-identical copies of the frame are available in the first and second data buffer DBUF_MAC1, DBUF_MAC2 in the external memory EXTMEMP1. In a next action 4, the processor RISCEP1 reads the first descriptor DESCR_MAC1 from the first transmission queue TQP1 and decodes the first descriptor DESCR_MAC1 to obtain the length and the start address of the frame stored in the first data buffer DBUF_MAC1, reads the frame either entirely or in parts at a time from the first data buffer DBUF_MAC1 in dependence on the first descriptor DESCR_MAC1 via a direct memory access (DMA), and writes the frame or the parts of the frame at appropriate sizes and positions in a first local FIFO WA_MAC1. Hereby, the frame or the parts of the frame are read as one or more data blocks of data stored in external memory EXTMEMP1, and written into the first local FIFO WA_MAC1. In an exemplary prior art example, action 4 comprises a first DMA read to read the descriptor DESCR_MAC1 as stored in the transmission queue TQP1 from the external memory EXTMEMP and a subsequent DMA read or subsequent DMA reads to read the frame MAC1 as stored in the first data buffer DBUF_MAC1 from the external memory EXTMEMP. In a next action 5, the processor RISCEP1 reads the second descriptor DESCR_MAC2 from the second transmission queue TQP2, decodes the second descriptor DESCR_MAC2 to obtain the length and the start address of the frame stored in second data buffer DBUF_MAC2, and reads the frame either entirely or in parts at a time from the second data buffer DBUF_MAC2 in dependence on the second descriptor DESCR_MAC2 via DMA and writes the frame in data blocks of appropriate sizes at positions in a second local FIFO WA_MAC2. In some prior art example, the size of a DMA access in action 4 corresponds to the block size used to store the frame in the first data buffer in action 4 and the size of a DMA access in action 5 corresponds to the block size used to store the frame in the second data buffer in action 5. In other prior art examples, the size of a DMA accesses and block size for storing in the first and second local buffers DBUF_MAC1, DBUF_MAC2 may be different; for example, the size of a DMA access may be larger than the block size in the local FIFO, in which case the data read in one DMA access is written into multiple blocks in the first and second data buffer DBUF_MAC1, DBUF_MAC2 respectively. Then, in action 6, the processor RISCEP1 checks whether the first transmitter buffer TxFIFO_MAC1 has free space to store one or more data blocks, and as long as there is free space, reads a data block from a respective position in the first local buffer WA_MAC1, processes the data block in a first thread, and writes the data block as processed into the first transmitter buffer TxFIFO_MAC1 of the first transmitter MAC1. Next, in action 7, the processor RISCEP1 checks whether the second transmitter buffer TxFIFO_MAC2 has free space to store one or more data blocks, and as long as there is free space, reads a data block from a respective positions in the second local buffer WA_MAC2, processes the data block in a second thread —separate from the first thread but executing substantially the same processing on the data block read from the second local buffer as the processing performed by first thread on the data block read from the first local buffer—and writes the data block as processed into the second transmitter buffer TxFIFO_MAC2 of the second transmitter MAC2. Typically, the first and second transmitters EMAC1, EMAC2 are arranged to inform the processor RISCEP1 that there is space in their respective first or second transmitter buffer TxFIFO_MAC1, TxFIFO_MAC2 by providing a request to the processor RISCEP1 to write data into their respective first or second transmitter buffers. The checking whether the first or second transmitter buffer thus typically comprises checking whether such requests are pending from the respective first or second transmitter EMAC1, EMAC2.

In prior art duplicast transmitter MPTDEVP1 without a hardware synchronization unit SYNCHW1, the first and second transmitters EMAC1, EMAC2 transmit the data buffered in the respective transmitter buffers as soon as the data has arrived. This may result in indeterminate transmission of the two plesio-identical frames as action 8, because of, for example, a significant and possibly variable latency due to copying the duplicate frames and the (second) descriptor in the external memory and reading the descriptors and the duplicate frames from the external memory and the RISC RISCEP1 temporally processing each request using one thread for EMAC1 and another thread for EMAC2 or using the same thread for EMAC1 and EMAC2. To prevent this, prior art duplicast transmitter MPTDEVP1 typically comprise additional components, in particular a hardware synchronization unit SYNCHW1 as shown in FIG. 1*a* to synchronize the transmission by the first and second transmitters EMAC1, EMAC2 to hereby obtain a synchronized transmission of the two plesio-identical frames as action 8. The hardware synchronization unit SYNCHW1 hereto waits for a first data block of a frame to be written to the first transmitter buffer TxFIFO_MAC1 of the first transmitter EMAC1 from the first local FIFO WAMAC1. The hardware synchronization unit SYNCHW1 then waits for a first data block of a plesio-identical frame to be written to the second transmitter buffer TxFIFO_MAC2 of the second transmitter EMAC2 from the second local FIFO WA_MAC2. The hardware synchronization unit SYNCHW1 then triggers synchronous transmission of both blocks on transmitter ports TPORTP1 and TPORTP2. This synchronous transmission uses hardware acceleration in hardware synchronization unit SYNCHW1 to monitor blocks and configure over which ports the hardware synchronization unit SYNCHW1 hardware operates and typically usage of the same clock source for transmitter ports TPORTP1 and TPORTP2. This can be inherently difficult in duplicast schemes and be inherently difficult to scale for multicast schemes. In addition the act of waiting for both first blocks or in some instances the frame to be written to the first and second local FIFOs WAMAC1 and WA_MAC2 increases the transmission latency for at least one of the frames in a duplicast scheme.

FIG. 2 shows another prior art example. FIG. 2 shows a communications processor UCP2 comprising a central processing unit (CPU) CPUP2 and a duplicast transmitter MPTDEVP2 for transmitting redundant data using a PRP protocol. The duplicast transmitter MPTDEVP2 comprises, similar to the duplicast transmitter MPTDEVP1 shown in FIG. 1*a*, a processor RISCEP2, a local memory LOCMEMP1 comprising a first local buffer WA_MAC1 and a second local buffer WA_MAC2, a first transmitter EMAC1 and a second transmitter EMAC2 comprising respective transmitter buffers TxFIFO_MAC1 and TxFIFO_MAC2 and respective transmitter ports TPORTP1 and TPORTP2, and—in a variant of the prior art example—a hardware synchronization unit SYNCHW1. The CPU CPUP2 and the duplicast transmitter MPTDEVP2 are connected to an external memory EXTMEMP2. The external memory EXTMEMP2 is used to store the data to be transmitted via each of the transmitters in a single data buffer DBUF_MAC12 in the external memory EXTMEMP2. Components and actions that are substantially the same as in the duplicast transmitter MPTDEVP1 shown in FIG. 1a, reference is made to the description above.

The duplicast transmitter MPTDEVP2 shown in FIG. 2 differs from that in FIG. 1a, in particular that action 2, copying the frame stored in external memory to another location in external memory, is omitted as the frames transmitted on both transmitters are identical, and that in action 3, the CPU CPUP2 generates descriptors DESCR_MAC2 for the second transmission queue TQP2 which have pointers referring to the same locations in external memory as the corresponding descriptors DESCR_MAC1 of the first transmission queue TQP2. Actions 1, 3, 4, 5, 6, 7 and 8 are further substantially the same as described with reference to FIG. 1a. In FIG. 1a and FIG. 2 the software on CPUP1 and CPUP2 has to maintain and manage a plurality of transmit queues for a corresponding plurality of transmitters, even if the frames are identical in FIG. 1a and FIG. 2 or plesio-identical in FIG. 1a.

As with the example shown in FIG. 1a, indeterminate transmission of the two plesio-identical frames may arise. The transmission of the two frames may, for example, show a significant and possibly variable latency, which may arise from copying the (second) descriptor in the external memory, reading the descriptors from the external memory, reading the frames from the external memory in action 4 and 5 without hardware synchronization unit SYNCHW1 and the RISC RISCEP2 temporally processing each request using one thread for EMAC1 and another thread for EMAC2 or using the same thread. Some prior art systems therefore use a hardware synchronization unit SYNCHW1 to synchronize the transmission by the first and second transmitters EMAC1, EMAC2, as in FIG. 1a, this comes at the cost of additional circuitry and does not reduce the latency arising from accessing the external memory via multiple DMA accesses to the multiple data buffers (such as the first and second data buffers DBUF_MAC1 and DBUF_MAC2) in external memory EXTMEMP.

FIG. 3 shows a prior art example wherein the transmitters comprising serial transmitters UMAC1, UMAC2, arranged to transmit data over two parallel serial networks SER_1, SER2. The serial transmitters may be arranged to use e.g. ProfiBUS or another RS-485 Universal Asynchronous receiver/transmitter (UART)-based serial protocol. Serial networks may be used, for example, in applications with a relatively low data rate.

The example shown in FIG. 3 shows a communications processor UCSP1 comprising a central processing unit (CPU) CPUS1 and a duplicast transmitter MPTDEVUP1 for transmitting redundant data using a RS-485 serial protocol. The duplicast transmitter MPTDEVUP1 comprises a processor RISCUP1, a plurality of arrays of registers comprising a first array of registers GPR_1 and a second array of registers GPR_2, a first transmitter UMAC1 and a second transmitter UMAC2 comprising respective transmitter buffers UTxFIFO_MAC1 and UTxFIFO_MAC2 and respective transmitter ports UPORTP1 and UPORTP2, and—in a variant of the prior art example—a hardware synchronization unit USYNC1. The transmitter ports UPORTP1 and UPORTP2 are connected to two different serial networks SER_1 and SER_2. The transmitters UMAC1 and UMAC2 are arranged to transmit data buffered in the transmitter buffers UTxFIFO_MAC1 and UTxFIFO_MAC2 via the transmitter ports UPORTP1 and UPORTP2. The plurality of arrays of registers may also be referred to as work area. The first array of registers GPR_1 and the second array of registers GPR_2 may also be referred to as local buffers. The transmitter buffers UTxFIFO_MAC1, UTxFIFO_MAC2 are implemented as cyclic First-In-First-Out (FIFO) buffers in local random access memory (RAM). In this example, the processor RISCUP1 is a reduced instruction set computing (RISC) processor.

The central processing unit CPUS1 and the duplicast transmitter MPTDEVUP1 are connected to an external memory EXTMEMUP. The external memory EXTMEMUP may be a DDR memory. The external memory EXTMEMUP is used to store the data to be transmitted via each of the transmitters in two data buffers DBUF_MAC1U and DBUF_MAC2U in the external memory EXTMEMUP. The duplicast transmitter MPTDEVUP1 is thus arranged to transmit data stored in the two data buffers DBUF_MAC1U and DBUF_MAC2U in external memory EXTMEMUP via the first and second transmitter buffers UTxFIFO_MAC1, UTxFIFO_MAC2 and the transmitter ports UPORTP1, UPORTP2.

The architecture of the example shown in FIG. 3 is largely similar to the architecture of the prior art example shown in FIG. 1a. For subsystems, components and actions that are substantially similar or substantially the same as described with FIG. 1a, reference is therefore made to the description above.

Because of the relatively low data rate used for serial transmission, there is no need to use a FIFO to store the frames or blocks read from the external memory EXTMEMUP. Accordingly, the example shown in FIG. 3 differs from the prior art Ethernet example shown in FIG. 1a in that the local buffer does not comprise two FIFOs WAMAC1, WAMAC2 capable to store one or more frames and/or data blocks, but the two arrays of registers GPR_1, GPR_2. Consequently, in action 4, the processor RISCUP1 reads the first descriptor DESCR_MAC1U from first transmission queue TQP1U, decodes the first descriptor DESCR_MAC1U to obtain the length and the start address of the frame stored in the first data buffer DBUF_MAC1U, reads the frame either entirely or one data block at a time from the first data buffer DBUF_MAC1U in dependence on the first descriptor DESCR_MAC1U via a direct memory access (DMA), and stores the frame in data blocks of appropriate sizes at positions in the first array of registers GPR_1, and, in action 5, the processor RISCUP1 reads the second descriptor DESCR_MAC2U from second transmission queue TQP2U, decodes the second descriptor DESCR_MAC2U to obtain the length and the start address of the frame stored in the second data buffer DBUF_MAC2U, reads the frame from the second data buffer DBUF_MAC2U in dependence on the second descriptor DESCR_MAC2U via DMA, and stores the frame in data blocks of appropriate sizes at positions in the second array of registers GPR_2. Then, in action 6, the processor RISCUP1 checks whether the first transmitter buffer UTxFIFO_MAC1 has free space to store one or more data blocks, and as long as there is free space, reads a data block from the first array of registers GPR_1, processes the data block in a first thread, and writes the data block as processed into the first transmitter buffer UTxFIFO_MAC1 of the first transmitter UMAC1. Next, in action 7, the processor RISCUP1 checks whether the second transmitter buffer UTxFIFO_MAC2 has free space to store one or more data blocks, reads a data block from the second array of registers GPR_2, processes the data block in a second thread —separate from the first thread but executing substantially the same processing on the data block read from the second array of registers as the processing performed by first thread on the data block read from the first array of registers—and writes the data block as processed into the second transmitter buffer UTxFIFO_MAC2 of the second transmitter UMAC2. Typically, the first and second transmitters UMAC1, UMAC2 are arranged to inform the processor RISCUP1 that there is space in their respective first or second transmitter buffer UTxFIFO_MAC1, UTxFIFO_MAC2 by providing a request to the processor RISCUP1 to write data into their respective first or second transmitter buffers. The checking whether the first or second transmitter buffer thus typically comprises checking whether such requests are pending from the respective first or second transmitter UMAC1, UMAC2. The other actions 1-3, and 8 may be similar as described with reference to FIG. 1a, with the arrays of registers substantially taking the places of the FIFOs WA_MAC1, WA_MAC2.

In variants of the prior art examples described above, the order of some of the actions may be different. For example in FIG. 3, after action 4 wherein the frame is read from the first data buffer DBUF_MAC1U and written to the first array of registers GPR_1, action 6 could be executed and result in transmission, before action 5 is executed. This may further increase latency and jitter observed.

For similar reasons as described with reference to FIG. 1a for an Ethernet-based multi-port transmitter, indeterminate transmission of the two plesio-identical frames may arise for the UART-based multi-port transmitter described with reference to FIG. 3.

SUMMARY OF THE INVENTION

The present invention provides a multi-port transmitter device for transmitting at least partly redundant data, an associated control system, an associated method and an associated computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 4:
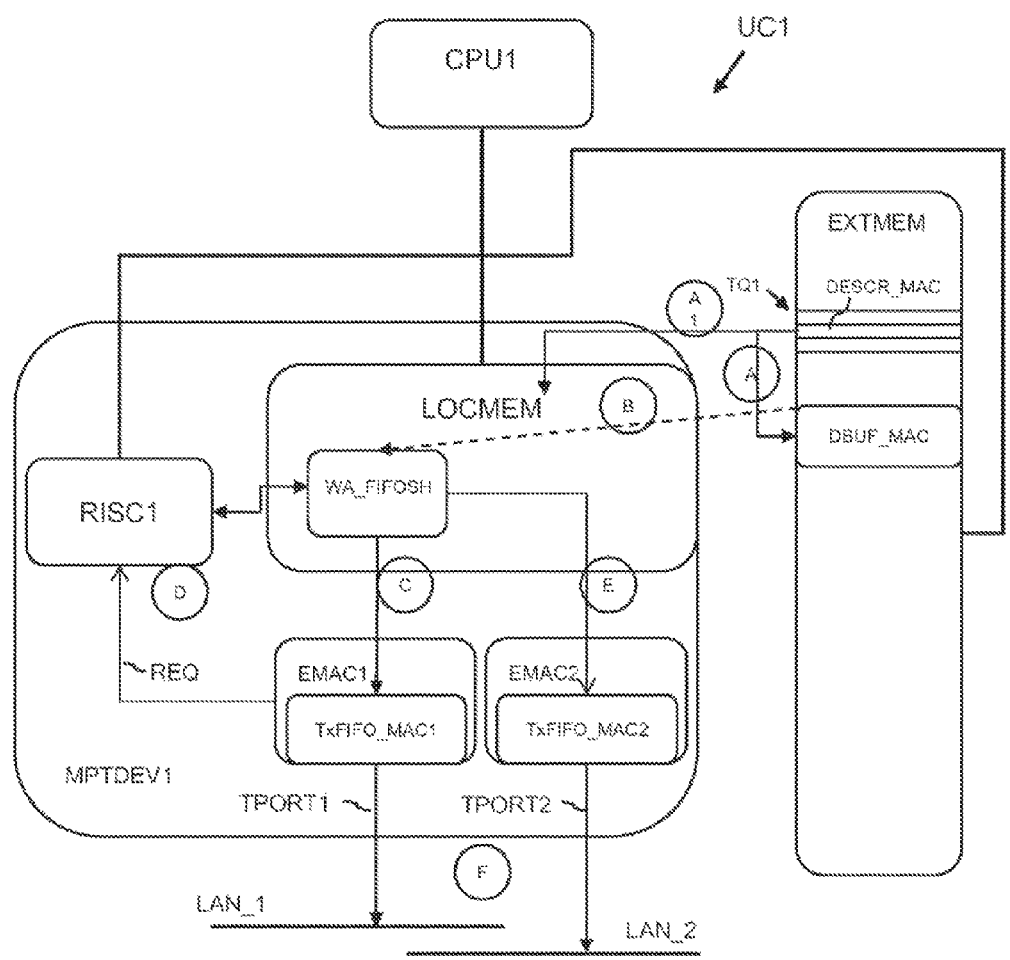
FIG. 4 schematically shows an example of an embodiment of an Ethernet-based multi-port transmitter.

FIG. 4 shows a communications processor UC1 having a duplicast transmitter MPTDEV1 according to an embodiment. The communications processor UCP1 comprises a central processing unit (CPU) CPU1 and a duplicast transmitter MPTDEV1 for transmitting redundant data using a PRP protocol. The duplicast transmitter MPTDEV1 comprises a processor RISC1, a local memory LOCMEM1 comprising a local buffer WA_FIFOSH, a first transmitter EMAC1 and a second transmitter EMAC2 comprising respective transmitter buffers TxFIFO_MAC1 and TxFIFO_MAC2 and respective transmitter ports TPORT1 and TPORT2. The transmitter ports TPORT1 and TPORT2 are connected to two different LANs LAN_1 and LAN_2. The transmitters EMAC1 and EMAC2 are arranged to transmit data buffered in the transmitter buffers TxFIFO_MAC1 and TxFIFO_MAC2 via the transmitter ports TPORT1 and TPORT2. The local memory LOCMEM1 may also be referred to as work area. The local buffer may comprise a First-In-First-Out buffer WA_FIFOSH. The transmitter buffers may comprise respective transmitter FIFOs TxFIFO_MAC1, TxFIFO_MAC2. In the example shown in FIG. 4, the local buffer WA_FIFOSH is implemented as cyclic First-In-First-Out (FIFO) buffers in local random access memory (RAM) of the duplicast transmitter MPTDEV1, and the transmitter buffers TxFIFO_MAC1, TxFIFO_MAC2 are implemented as cyclic FIFO buffers in local or hardware memory in the first and second transmitters EMAC1 and EMAC2 respectively. The local RAM, LOCMEM, is accessible by the processor RISC1 and by the first and second transmitters EMAC1, EMAC2. In this example, the processor RISC1 is a reduced instruction set computing (RISC) processor, but it may be any suitable type of processor. Also, the processor RISC1 may be a separate functional unit as indicated in FIG. 4, or part of the CPU CPU1.

The first transmitter EMAC1 is arranged to act as a master transmitter, and is hereto further arranged to issue a request (indicated as REQ) to the processor to provide a data block when the transmitter buffer TxFIFO_MAC1 of the first transmitter EMAC1 has free space to store a data block.

The central processing unit CPU1 and the duplicast transmitter MPTDEV1 are connected to an external memory EXTMEM1. The external memory EXTMEM may be a DDR memory. The external memory EXTMEM is used to store the data to be transmitted in one data buffer DBUF_MAC in the external memory EXTMEM.

The redundant transmission by art communications processor UC1 may be schematically illustrated with reference to letters A-F shown in circles in FIG. 4.

Figure 1A:
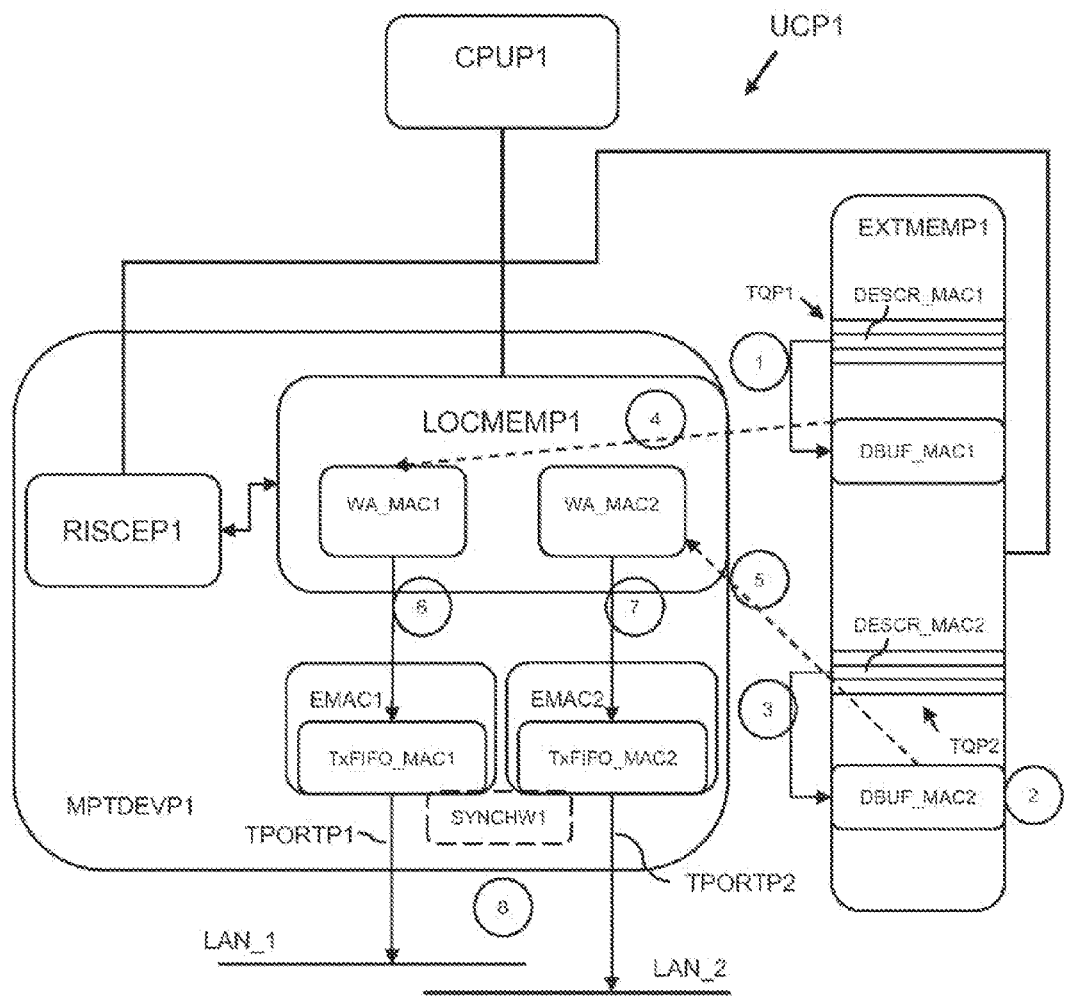
FIG. 1a schematically shows a prior art example of a communications processor having an Ethernet-based multi-port transmitter.
Figure 1B:
FIG. 1b schematically shows an example of a descriptor.
Figure 2:
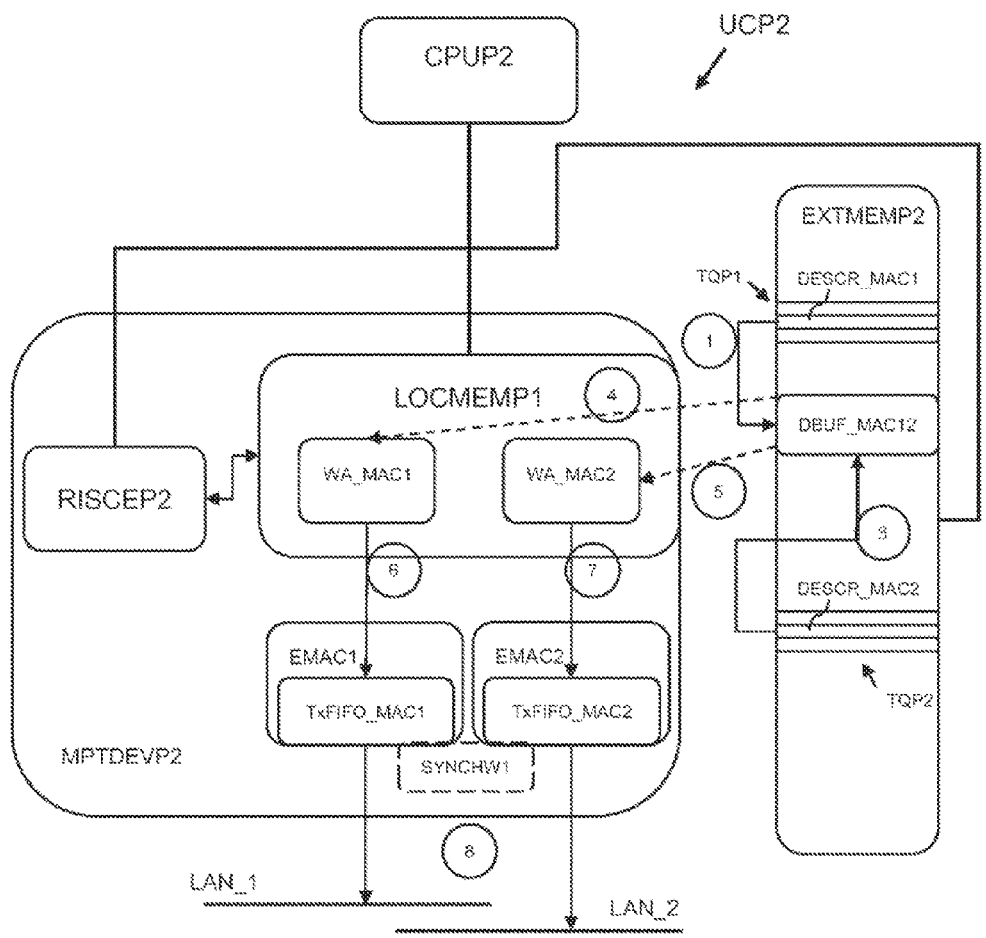
FIG. 2 schematically shows another prior art example of a communications processor having an Ethernet-based multi-port transmitter.

Based on the address and length of a frame stored in PRP format in the external memory at a position in the data buffer DBUF_MAC in the external memory EXTMEM1, the CPU CPU1 generates a descriptor DESCR_MAC pointing to the frame and stores the descriptor in a transmission queue TQ1 in the external memory EXTMEM1 in a first action A. The descriptor DESCR_MAC may for example be in a similar format as schematically illustrated in FIG. 1b: the descriptor DESCR_MAC1 may comprise a status and control field DSTATCTRL, a data length DLEN indicating the length of the frame and a data address DPNT providing a pointer to a start address of the frame in the external memory. The status and control field DSTATCTRL may comprise a so-called buffer ready flag, indicating whether data is available at the respective position. In a next action A1, the processor RISC1 reads the descriptor DESCR_MAC into the local memory, LOCMEM, from the transmission queue TQ1 in the external memory EXTMEM1. In a next action B, the processor RISC1 reads the frame either entirely or in parts at a time from the data buffer DBUF_MAC in dependence on the descriptor DESCR_MAC via a direct memory access (DMA), and stores the frame or the parts of the frame of appropriate sizes at positions in a local FIFO WA_FIFOSH. Hereby, the frame or the parts of the frame are read as one or more data blocks of data stored in external memory EXTMEM1, and written into the local FIFO WA_FIFOSH. The processor RISC1 may thus be arranged to read the at least one data block of data stored in the external memory in dependence of a descriptor, the descriptor comprising at least a length and a position in the external memory of a frame comprising the at least one data block.

In an embodiment, the processor RISC1 formats the frame to obtain the data blocks in a predefined format before storing the data blocks at positions in the local FIFO. The processor RISC1 may e.g. format the RCT data in a format reflecting the protocol used by the physical layer used for the transmission. The processor RISC1 may additionally or alternatively e.g. append metadata and/or determine and appending a check sum or an FCS. The metadata may e.g. be used to indicate a type of the data block to the transmitters, e.g., indicating that the data block is a first block of a new frame, a last block of a frame or comprises a specific field such as comprising the network identifier.

Then, in action C, the processor RISC1 checks whether the first transmitter buffer TxFIFO_MAC1 has free space to store a data block, and if has free space, initiates and executes transfer of a data block from the local buffer WA_FIFOSH to the first transmitter buffer TxFIFO_MAC1. For executing the transfer, the processor is arranged to read a data block from its respective position in the local buffer WA_FIFOSH, process the data block, and write the data block as processed into the transmitter buffer TxFIFO_MAC1 of the first transmitter MAC1. The data block is thus read a first time from its respective position in the local buffer WA_FIFOSH. The checking whether the first transmitter buffer has free space may be performed by checking whether a request REQ to provide a data block is pending from the first transmitter EMAC1. The processor RISC1 may further signal to the first transmitter that the data block has been written, for example by changing a write pointer that is accessible by the first transmitter, by issuing a suitable interrupt signal, by incrementing a counter, by using a timer or by any other suitable action.

In an alternative embodiment, the processor RISC1 does not write the data block into the transmitter buffer, but provides the data block in another manner. For example, the processor RISC1 may initiate transfer of a data block from the local buffer WA_FIFOSH to the first transmitter buffer TxFIFO_MAC1, for example by giving a command in the form of an opcode or by providing suitable metadata in the local buffer WA_FIFOSH to the first transmitter such that the first transmitter hardware knows it can read the data block from the local buffer WA_FIFOSH.

If a PRP scheme is used, the processor RISC1 subsequently modifies the data block if the data block comprises data that is required to be different for the first and second transmitter in a next action D. Thus, if the data block comprises the network identifier, the processor RISC1 modifies the network identifier in the RCT from corresponding to LAN_1 to corresponding to LAN_2 by, for example, flipping the corresponding bit of the network identifier. If there is other or more data in the data block that is specific for one of the transmitters, the processor RISC1 may modify more data. Thus, in action D, the processor RISC1 may modify the data block from having a first content into having a second content. The first content may be specific for the first transmitter and the second content may be specific for the second transmitter. As a result, after modification, the data block at least partly different from what it was before modification. The processor RISC1 may further, after having modified the data block from having the first content into having the second content, store the data block having the second content in the respective position in the local buffer where the data block having the first content was stored. The data block may thus, after having been modified, be written back to its original position in the local buffer WA_FIFOSH. This may allow the processor RISC1 to, if needed in a later action, when executing transfer of the data block to the second transmitter, read the data block from the respective position a second time, with the data block having the second content.

Next, in action E, the processor RISC1 checks whether the second transmitter buffer TxFIFO_MAC2 has free space to store a data block. If free space, the processor RISC1 initiates and executes transfer of a data block from the local buffer WA_FIFOSH to the second transmitter buffer TxFIFO_MAC2. For executing the transfer, the processor reads the data block again from the respective position in the local buffer WA_FIFOSH and writes the data block to the transmitter buffer TxFIFO_MAC2 of the second transmitter EMAC2 of the at least two transmitters. Herein, the data block is thus read a second time from its respective position in the local buffer WA_FIFOSH. The processor RISC1 repeats actions C, D and E as long as there are data blocks in the local buffer WA_FIFOSH. For a multicast transmitter having more than two transmitters, actions C, D and E may be repeated until all transmitters are provided with the—where needed, appropriately modified—data block.

In the alternative embodiment, the processor RISC1 may initiate transfer of the data block from the local buffer WA_FIFOSH to the second transmitter buffer TxFIFO_MAC2 by giving a command, for example in the form of an opcode or metadata in the local buffer WA_FIFOSH, to the second transmitter such that the second transmitter hardware knows it can read the data block from the local buffer WA_FIFOSH.

In the example described above, the sequence of initiating transfer of the data block from the local buffer WA_FIFOSH to the different transmitters corresponds to first initiating transmission to the master transmitter EMAC1 and subsequently serving the other transmitters EMAC2. However, in alternative embodiments, the sequence of initiating transfers may be a different sequence wherein the master transmitter is not the first transmitter in the sequence of initiating transfer. For example, transmitter EMAC2 may be the master transmitter and a predetermined sequence may be to first initiate transfer to the first transmitter EMAC1 and subsequently to the master transmitter. A substantially synchronous transmission of the plesio-identical frames over the first and second transmitter ports TPORT1 and TPORT2 may thus be obtained, as indicated with action F in FIG. 4. A substantially synchronous transmission may further be referred to as plesiochronous transmission.

FIG. 4 thus shows an example of a multi-port transmitter device MPTDEV1 for transmitting at least partly redundant data. The multi-port transmitter device comprises at least two transmitters EMAC1, EMAC2 comprising respective transmitter buffers TxFIFO_MAC1, TxFIFO_MAC2 and respective transmitter ports TPORT1, TPORT2 and a processor RISC1. The transmitters are arranged to transmit data buffered in the transmitter buffers via the transmitter ports. One transmitter of the at least two transmitters is a master transmitter further arranged to issue a request to the processor to provide a data block when the transmitter buffer of the master transmitter has free space to store a data block. The processor RISC1 is arranged to read B at least one data block of data stored in an external memory EXTMEM from the external memory and store the at least one data block at respective at least one positions in a local buffer WA_FIFOSH and, per data block. The processor is arranged to sequentially initiate transfer of the data block from the respective position of the data block in the local buffer to the transmitter buffer of the master transmitter and to the transmitter buffers of at least one further transmitter of at least two transmitters in response to a request from the master transmitter to provide a data block. Herein, the processor is arranged to sequentially initiate transfer in accordance with a predefined sequence of transmitters, the predefined sequence starting at a first transmitter selected from the master transmitter and the at least one further transmitter and continuing with a subsequent transmitter.

In an embodiment, the master transmitter may be the first transmitter of the predefined sequence.

In another embodiment, one of the at least one further transmitters is the first transmitter of the predefined sequence.

In an embodiment, the processor is arranged to, for one or more data blocks of the at least one data blocks, initiate transfer of the data block from the respective position in the local buffer to the subsequent transmitter of the predefined sequence only after the first transmitter of the predefined sequence received the data block. In embodiments where the multi-port transmitter device comprises more than two transmitters, the processor may be arranged to continue in a similar manner for transferring the data block to every next subsequent transmitter of the predefined sequence, by being arranged to initiate transfer of the data block from the respective position in the local buffer to the every n-th transmitter of the predefined sequence only after the (n−1)-th transmitter of the predefined sequence received the data block.

In an embodiment, the processor is arranged to, for one or more data blocks of the at least one data blocks, read the data block the second time from the respective position in the local buffer only after the first transmitter received the data block.

In an embodiment, the processor is arranged to, for at least one data block of the one or more data blocks, modify D the data block from having a first content into having a second content in between initiating transfer of the data block to the transmitter buffer TxFIFO_MAC1 of the first transmitter and initiating transfer of the data block to the transmitter buffer TxFIFO_MAC2 of the second transmitter. In embodiments where the multi-port transmitter device comprises more than two transmitters, the processor may be arranged to continue in a similar manner with modifying the content of the data block for every next subsequent transmitter of the predefined sequence in between initiating transfer of the data block to every (n−1)-th transmitter and the subsequent n-th transmitter of the predefined sequence.

In an embodiment, the processor is arranged to, for one or more data blocks that need to be modified, read the data block the second time from the respective position in the local buffer only after the first transmitter received the data block. In a further embodiment, the processor may be arranged to, for one or more data blocks that does not need to be modified, read the data block the second time from the respective position in the local buffer without waiting for the first transmitter to complete receiving the data block.

With the multi-port transmitter device according to the embodiments described, substantially synchronous transmission by the two transmitters may be achieved (indicated as F in FIG. 4) without a hardware synchronization unit SYNCHW1. Further, with the multi-port transmitter device according to the embodiments described, substantially synchronous transmission by the two transmitters may be achieved without copying the frame to another location in the external memory, without reading the frame more than one time from the external memory, without managing more than one transmit queue, without needing two work areas and with reduced external memory transactions. Further, in embodiments, substantially synchronous transmission by the two transmitters may be achieved without a plurality of threads for a plurality of transmitters. The multi-port transmitter device according to the embodiments described may thus provide a substantially simpler software and hardware implementation capable of supporting a plurality of protocols and a plurality of identical, plesio-identical and quasi-identical blocks and frames transmission. The time delay between the two transmissions may be only marginal, as it is no longer dominated by a two-fold external accesses to the external memory for reading the data from the external memory coupled with the RISC temporally processing each request using one thread for EMAC1 and another thread for EMAC2 or using the same thread, but substantially governed by the much faster transfer from the local buffer WA_FIFOSH to the transmitter buffer TxFIFO_MAC1 and the little amount of processing time that the processor RISC1 uses for modifying the data blocks of a data block that needs to be modified. Further, the latency between making a frame available to the communications processor and transmitting the frame and/or the jitter thereon may be significantly reduced compared to using known multi-cast transmitters.

The first transmitter EMAC1 may be arranged to inform the processor of completing receiving of the data block. For example, the first transmitter EMAC1 may set a status register to indicate its activity, or give an interrupt signal to the processor RISC1.

The processor RISC1 may be arranged to determine whether the first transmitter EMAC1 completed the receiving of the data block, and, only after having determined that the first transmitter EMAC1 completed the receiving of the data block, initiate transfer of the data block to the second transmitter EMAC2. Hereby, it may be prevented that the data block is overwritten or partially overwritten after having been modified before the original data block is fully received by the first transmitter EMAC1 in its transmitter buffer TxFIFO_MAC1.

In an embodiment, the processor RISC1 is arranged to, after having modified D the data block from having the first content into having the second content, store the data block having the second content in the respective position in the local buffer WA_FIFOSH where the data block having the first content was stored. This allows the processor to either read the data block having the second content from the same respective position in the work area before providing the data block to the second transmitter or append/pre-pend metadata to the block before signalling to the second transmitter that the block is ready for reading. Further, area usage of work area may be reduced compared to prior art systems where dedicated local buffers are used in the local memory of the processor RISC1 for each transmitter.

In embodiments, the second content may be plesio-identical or quasi-identical to the first content. Hereby, the corresponding frames may be plesio-identical or quasi-identical.

In embodiments, the first content and the second content may relate to identical information data, and first content and the second content relating to at least partly-different control data. The second content may thus differ from the second content by different control data only, such as a different RCT, in particular a different network identifier LANID. The first content and the second content may thus, for example, differ by the network identifier corresponding to LAN_1 for the first content and LAN_2 for the second content. In some embodiments, the transmitters EMAC1 EMAC2 may calculate a Field Check Sequence (FCS) for each frame and extend each frame to be transmitted with the FCS. In other embodiments, the processor RISC1 may calculate the FCS and extend one of the data blocks with the FCS, or provide the FCS in an additional data block.

Figure 5:
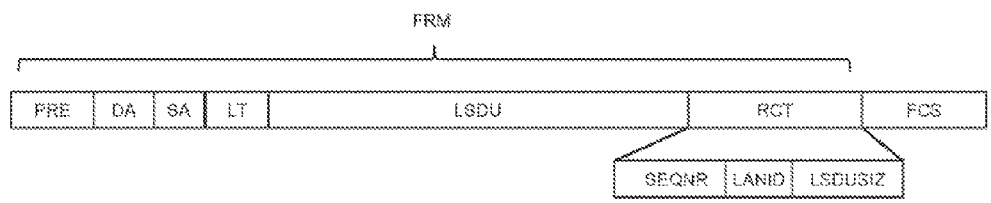
FIG. 5 shows an example of a frame structure as used in PRP.

FIG. 5 shows an example of a frame structure as used in PRP. The frame FRM comprises a plurality of fields: a pre-amble PRE, a destination address field DA, a source address field SA, a type indicator field LT, a payload field LSDU and a redundancy control trailer field RCT. The redundancy control trailer field RCT field comprises a sequence number SEQNR of the frame, a network identifier LANID and a frame size parameter LSDUSIZ, indicating the size field of the payload LSDU. A frame may further be supplemented with a so-called Field Check Sequence (FCS) to provide a cyclic redundancy check. Destination address, source address, a so-called payload field comprising the data to be transmitted (hereafter referred to as information), sequence number and frame size parameter are identical between duplicate frames, whereas the network identifier and, if present, the FCS are different between the redundant, plesio-identical, frames to be transmitted. When breaking down such a frame into a plurality of data blocks for the first and second transmitter into the local buffer WA_FIFOSH, some of the data blocks may comprise data that is identical for the two transmitters and some other data blocks may be plesio-identical, quasi-identical or different when provided to the two transmitters: data blocks comprising only payload field information comprise identical data for both transmitters, whereas a data block comprising the network identifier differs by one bit and is thus plesio-identical for the two transmitters when using PRP or a similar scheme. The processor RISC1 may thus be arranged to, for each data block, determine whether a modification of the data block needs to be performed in initiating transfer of the data block to the first transmitter of the predefined sequence and initiating transfer of the data block to the subsequent transmitter of the predefined sequence. The processor RISC1 may be arranged to if no modification needs to be performed: initiate transfer E of the data block to the subsequent transmitter after initiating transfer of the data block to the first transmitter. The processor RISC1 may be arranged to, if modification needs to be performed, modify D the data block from having a first content into having a second content in between initiating transfer of the data block to the first transmitter and initiating transfer of the data block to the second transmitter, and, only after transfer of the data block to the first transmitter is completed: store the data block having the second content in the respective position in the local buffer where the data block having the first content was stored, and initiate transfer E of the data block having the second content to the subsequent transmitter.

Figure 6:
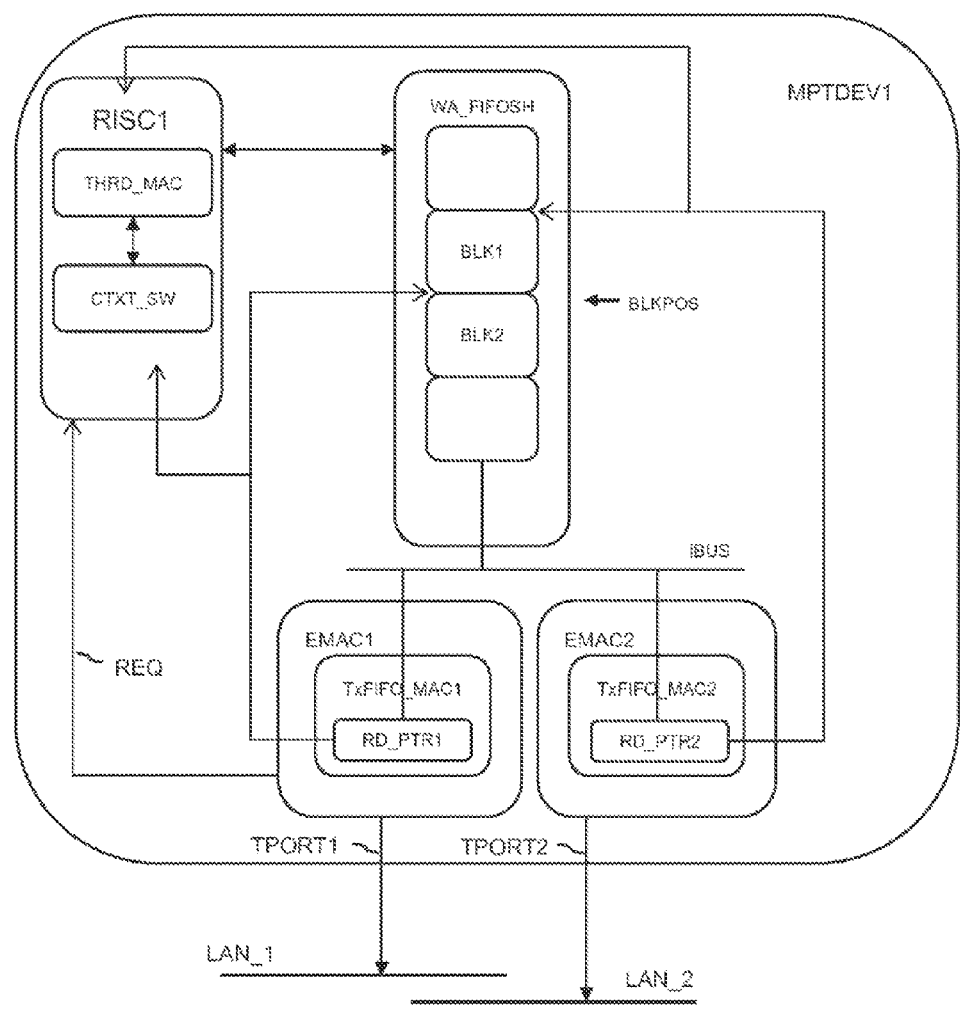
FIG. 6 schematically illustrates an exemplary embodiment of a duplicast transmitter.
Figure 7:
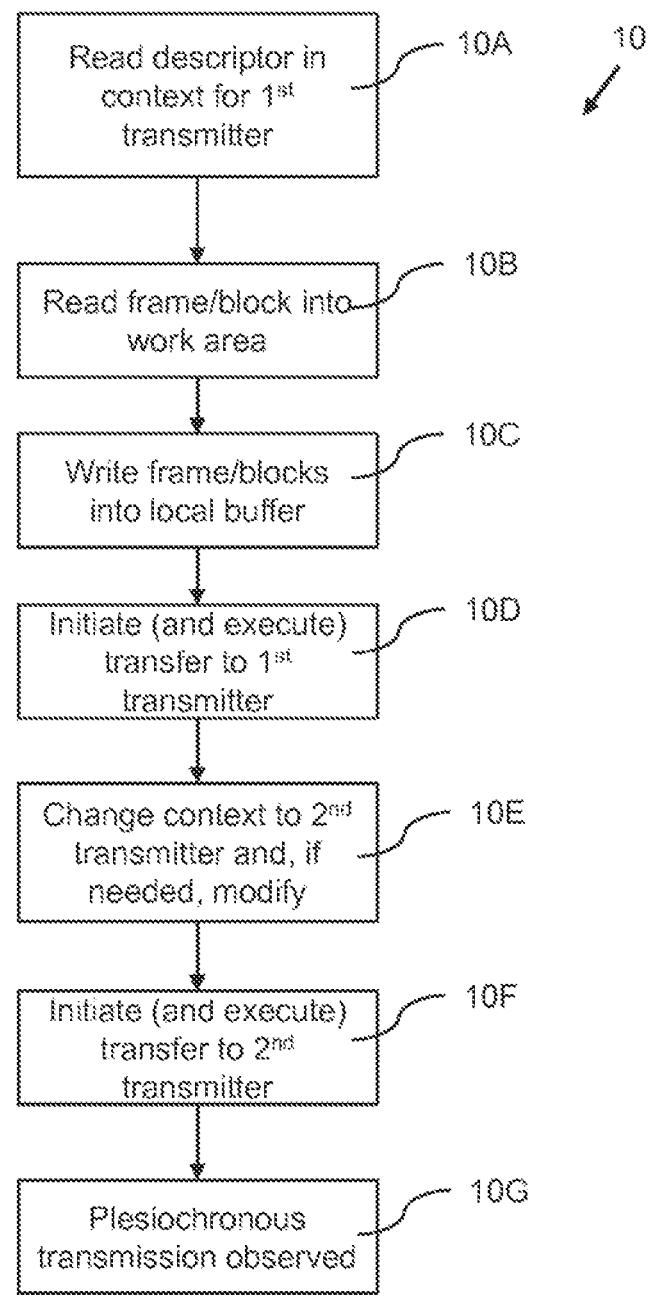
FIG. 7 schematically shows a method according to an embodiment.
Figure 8:
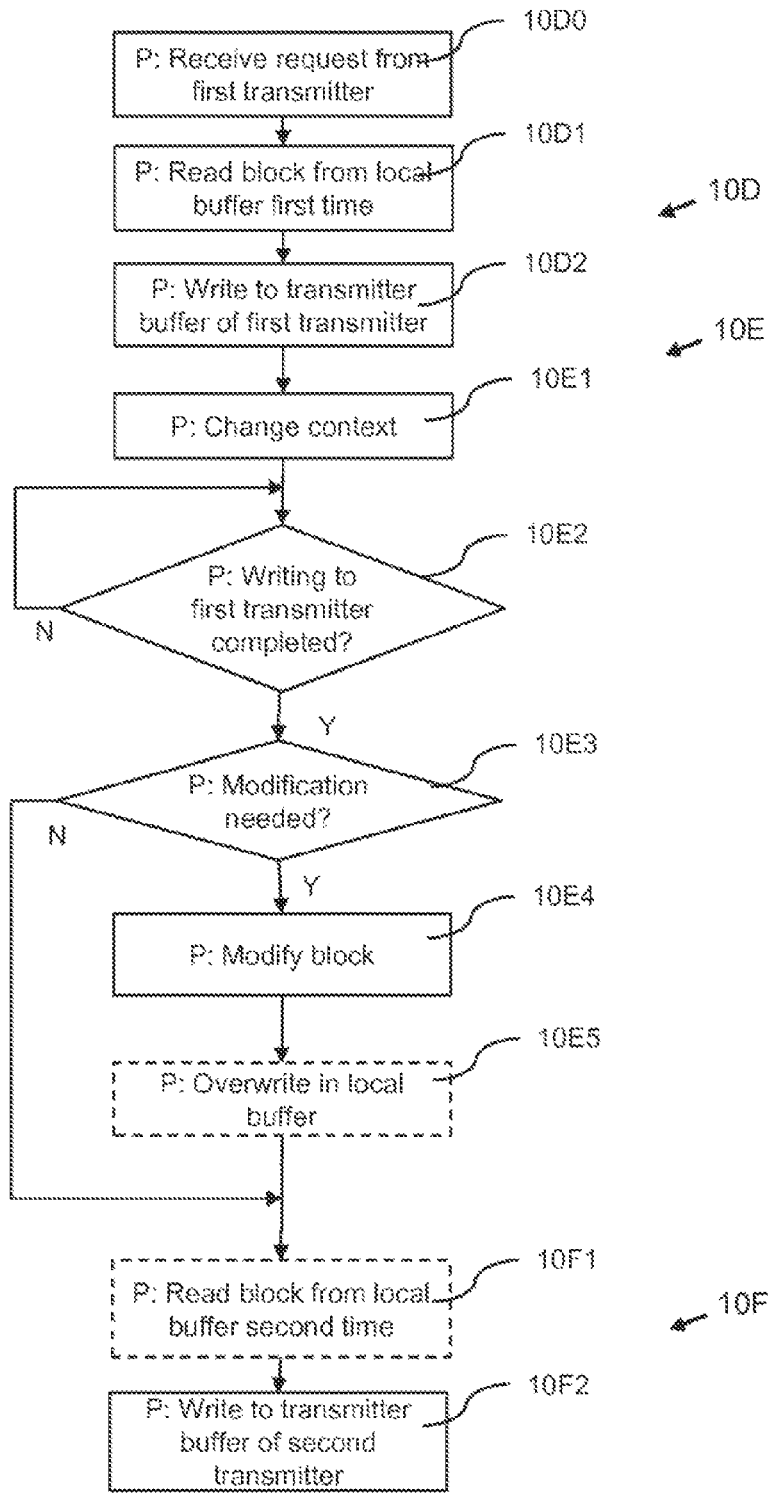
FIG. 8 schematically shows further details of an embodiment of a method.

FIG. 6, FIG. 7 and FIG. 8 schematically illustrate an example of operation of an exemplary embodiment of the duplicast transmitter MPTDEV1 shown in FIG. 4. FIG. 6 schematically illustrates an exemplary embodiment of the duplicast transmitter MPTDEV1. FIG. 7 shows a method 10 of operation. FIG. 8 shows further details of an (alternative) embodiment of the method 10.

As shown in FIG. 6, the processor RISC1 may be capable to operate a thread THRD_MAC in a first context associated with the first transmitter and switch to a second context associated with the second transmitter, and to switch back. The processor RISC1 is arranged to, in the first context, read 10A a descriptor from the first transmission queue TQ1 from the external memory EXTMEM, to read 10B a frame from the external memory EXTMEM via DMA in accordance with the descriptor, and write 10C the frame in multiple data blocks into the local FIFO WA_FIFOSH as a plurality of successive block positions BLKPOS. The frame may e.g. have a length of 255 bytes of data, whereas a data block may have a maximum size of 64 bytes. The processor RISC1 may then read the frame in 3 blocks of 64 bytes and 1 block of 63 bytes. In alternative examples, the processor RISC1 may be arranged to prepend header information and/or to append trailer information, such as a block containing an FCS for the transmit frame, the processor RISC1 programs the plurality of blocks in the local buffer to also store this additional header information and/or trailer information.

If the first transmitter EMAC1 has free space in its transmitter buffer TxFIFO_MAC1, the first transmitter generates a request REQ to the processor. If the processor RISC1 gets such request REQ, the processor RISC1 checks, in the first context, whether data blocks are available for the first transmitter in its local buffer WA_FIFOSH. If there are no data blocks available, the processor RISC1 checks whether a next frame can be read from the external memory EXTMEM by reading a next descriptor DESCR_MAC from the transmission queue TQ1, and checking whether the status and control field DSTATCTRL indicates that a frame is available to be read. If so, the processor RISC reads the frame 10B and writes 100 it into the local buffer WA_FI-FOSH in blocks, as described above.

After the processor RISC1 detected that data blocks are present or after having read a frame and writing data blocks into the local buffer WA_FIFOSH, the processor RISC1 continues to serve the request of the first transmitter EMAC1 and initiates and executes 10D transfer of a first data block of the data blocks in its local buffer WA_FIFOSH to the first transmitter EMAC1. Hereby, the processor RISC1 makes the first data block available to the first transmitter EMAC1 for copying to its transmission buffer TxFIFO_MAC1. The first transmitter EMAC1 then starts to read the first data block from the local buffer and copy the first data block into its transmission buffer TxFIFO_MAC1. The first transmitter EMAC1 may, for example, read and copy the first data block one byte at a time over an internal data bus IBUS, as indicated in FIG. 6. After the first transmitter EMAC1 completed the copying of the first data block, the first transmitter EMAC1 adjusts its read pointer RD_PTR1 accordingly. This is indicated in FIG. 6 illustrating that the read pointer RD_PTR1 points to a location of a successive data block BLK2. If the first transmitter EMAC1 still has free space in its transmitter buffer TxFIFO_MAC1 after having read the first data block into the transmitter buffer TxFIFO_MAC1, the first transmitter generates a next request to the processor. In an alternative embodiment, shown in FIG. 8, action 10D comprises initiating as well as executing transfer of a first data block by the processor RISC1, where executing the transfer comprises reading 10D1 the data block from its local buffer by the processor RISC1 and providing 10D2 the data block to the first transmitter EMAC1 by writing it into transmission buffer TxFIFO_MAC1.

The processor RISC1 then changes 10E,10E1 context of the thread THRD_MAC to the second context i.e. that associated with the second transmitter. Hereto, a context switch unit CTXT_SW may be provided inside the processor RISC1 to, if needed, save any information for use in a subsequent returning to the first context.

In another exemplary embodiment, the thread THRD_MAC may be implemented as a single software routine arranged to change context without using a hardware context switch unit CTXT_SW.

Thus, the processor RISC1 may be operable with a software routine switchable between at least two contexts, each context being associated with servicing a respective transmitter, the servicing comprising at least initiating transfer of the data block to the transmitter buffer of the respective transmitter. The servicing may further comprise executing the transfer by the processor, wherein the processor writes the data block into the transmission buffer of the respective transmitter. Alternatively, the servicing may further comprise letting the respective transmitter execute the transfer, wherein the respective transmitter reads the data block from the local buffer WA_FIFOSH and write the data block into its transmitter buffer.

After the processor RISC1 changed context, the processor RISC1 monitors 10E2 the reading of the first data block BLK1 by the first transmitter EMAC1 by monitoring the status of its read pointer RD_PTR1.

In an embodiment, after the processor RISC1 detected that the first transmitter EMAC1 completed reading the first data block BLK1, the processor RISC1 reads the first data block BLK1 from its local memory, and checks 10E3 whether the first data block requires modification, such as whether a bit needs to be flipped when the first data block comprises the network identifier to change the network identifier from indicating LAN_1 to indicating LAN_2. Then, if the first data block BLK1 needs to be modified, the processor RISC1 modifies 10E4 the first data block BLK1, and writes 10E5 the data block, as modified, back into the local buffer WA_FIFOSH at its original location in the local buffer WA_FIFOSH. The processor RISC1 hereby overwrites the first data block with its modified content, allowing the second transmitter EMAC2, to read the first data blocks with its content modified as required for the second transmitter EMAC2.

The processor RISC1 then initiates and executes 10F transfer of the first data block (if modified, as modified) to the second transmitter EMAC2. Hereby, the processor RISC1 makes the first data block available to the second transmitter for reading. The second transmitter EMAC2 may then start to read the first data block into its transmission buffer TxFIFO_MAC2. The second transmitter EMAC2 may, for example, read the first data block one byte at a time over the internal data bus IBUS. After the second transmitter EMAC2 completed the reading of the first data block, the second transmitter EMAC2 adjusts its read pointer RD_PTR2 accordingly. In an alternative embodiment, shown in FIG. 8, initiating 10F transfer of a first data block to the second transmitter EMAC2 comprises reading 10F1 the block from its local buffer and providing 10F2 it to the second transmitter EMAC2 by writing it into transmission buffer TxFIFO_MAC2. The processor thus sequentially initiates, and optionally executes, transfer of the first data block from the same position in the local buffer to the transmitter buffer of the transmitters in a predefined sequence. In this embodiment, the predefined sequence is defined as first initiating transfer to the first transmitter which acted as a master transmitter and subsequently initiating transfer to the transmitter buffer of the second transmitter.

In an alternative embodiment, the processor RISC1 may be arranged to check whether the data block needs data modification without first waiting until the first transmitter EMAC1 has completed reading of the first data block, and only wait until the first transmitter EMAC1 has completed reading of the first data block when modification is needed, whereas initiating transmission to the second transmitter without waiting for the first transmitter to complete reading of the first data block when no modification is needed.

In an alternative embodiment, where a frame is stored in the local buffer WA_FIFOSH in a plurality of data blocks, the processor RISC1 may determine whether a data block to be read requires modification prior to reading the data block. The processor RISC1 may e.g. determine whether the data block corresponds to a part of a frame that is identical for different transmitters or to a part that is different, such as a part comprising the network identifier. The processor RISC1 may hereto, for example, detect that the first transmitter EMAC1 completed reading data blocks associated with a single frame beyond a position where differing content is needed.

In an alternative embodiment the order of checks performed in 10E2 and 10E3 are switched dependent on the location of the data that is modified for each transmitter. If the location of the data that is modified for each transmitter is located in the first block of a plurality of data blocks associated with a single frame, it may yield a reduced latency by checking whether modification is required before checking if the transfer to the first transmitter is complete. The order of actions 10E1, 10E2, 10E3, 10E4, 10E5, 10F1 and 10F2 may this be different from the order of the actions 10E1, 10E2, 10E3, 10E4, 10E5, 10F1 and 10F2 as shown in FIG. 8. Further, a plurality of sequences of these actions may be realized for optimal processing and latency characteristics for a plurality of protocols or functions being processed by processor RISC1.

The transmitters EMAC1 and EMAC2 transmit data buffered in the transmitter buffers TxFIFO_MAC1, TxFIFO_MAC2 via the transmitter ports TPORT1, TPORT2. Hereto, the transmitters EMAC1 and EMAC2 read the data from the respective transmitter buffers TxFIFO_MAC1, TxFIFO_MAC2, and may further determine and add suitable metadata, such as adding a FCS for transmitting over Ethernet, if no FCS was added by the processor RISC1. For determining suitable metadata, the at least two transmitters may comprise respective arithmetic circuitry arranged to determine data integrity check information, for example redundancy check information e.g. a CRC, and to transmit the data integrity check information as determined.

As a consequence of the method described above, comprising switching context per data block and providing the data blocks to the different transmitters subsequently by reading (by the transmitters or by the processor) from the same position in the local buffer WA_FIFOSH, a plesiochronous transmission is achieved 10G.

In an embodiment, the processor RISC1 is arranged to change context in a software process in dependence on which transmitter is to be provided.

In an alternative embodiment, the processor RISC1 operates two parallel threads with respective contexts corresponding substantially to the first and second context of the single thread.

In the embodiments described above, the at least two transmitters comprise at least two Ethernet transmitters EMAC1, EMAC2.

In an alternative embodiment, a plurality of RISCs operate in parallel with respective contexts corresponding substantially to the first and second context.

In the embodiments described above, the local buffer WA_SIFOSH may comprise a FIFO. This may allow reading from the external memory transmitting via the two networks LAN_1, LAN_2 at relatively high-speed without interruptions, as the FIFO may be operated to substantially always be able to provide data blocks such that no buffer underruns occur in the transmitter buffers. Further, the processor RISC1 may have a write pointer into the local buffer that may be many blocks ahead of the read pointers used by the transmitters, such that reading further frames from the external memory EXTMEM does not need to be paused while the transmitters are processing a frame.

In the embodiments described above, the transmitter buffers may comprise respective transmitter FIFOs TxFIFO_MAC1, TxFIFO_MAC2. Hereby, the transmitters UMAC1, UMAC2 may substantially provide the data blocks associated with one frame, and typically also subsequent frames, without interruptions.

In an embodiment, the transmitters are arranged to be connected to the same clock source. Hereby, all transmitters may read from the respective transmitter buffers in a synchronized manner and may herein maintain a fixed phase relation between the transmitters over longer periods of time.

In an alternative embodiment, the transmitters are arranged to be clocked from different clock sources, with all clock sources having substantially the same nominal clock frequency. Herein, small variations between the clock frequencies of all clock sources are handled when the protocol or transmit scheme necessitates idle periods between frames, such as in EtherCAT or Profibus (of which embodiments are described below); in such cases, the idle periods may be used to correct for any small phase differences introduced between the transmitters during the transmission of the blocks of one frame, as the phase relation may be effectively reset at the start of transmission of a next frame.

In the embodiments described above with reference to FIG. 8, the processor RISC1 is arranged to sequentially initiate as well as execute transfer of the data block to the respective transmitter buffers of the transmitters, as indicated with a "P:" preamble in each block in FIG. 8. Thus, in the embodiments described above, the processor is arranged to, upon initiating the transfer to the transmitter buffer of the first transmitter of the predefined sequence, also execute the transfer by copying the data block from the respective position of the data block in the local buffer to the transmitter buffer of the first transmitter, and the processor is arranged to, for each other transmitter of the predefined sequence, upon initiating the transfer to the transmitter buffer (of the other transmitter), execute the transfer by copying the data block from the respective position of the data block in the local to the transmitter buffer of the other transmitter.

Figure 9:
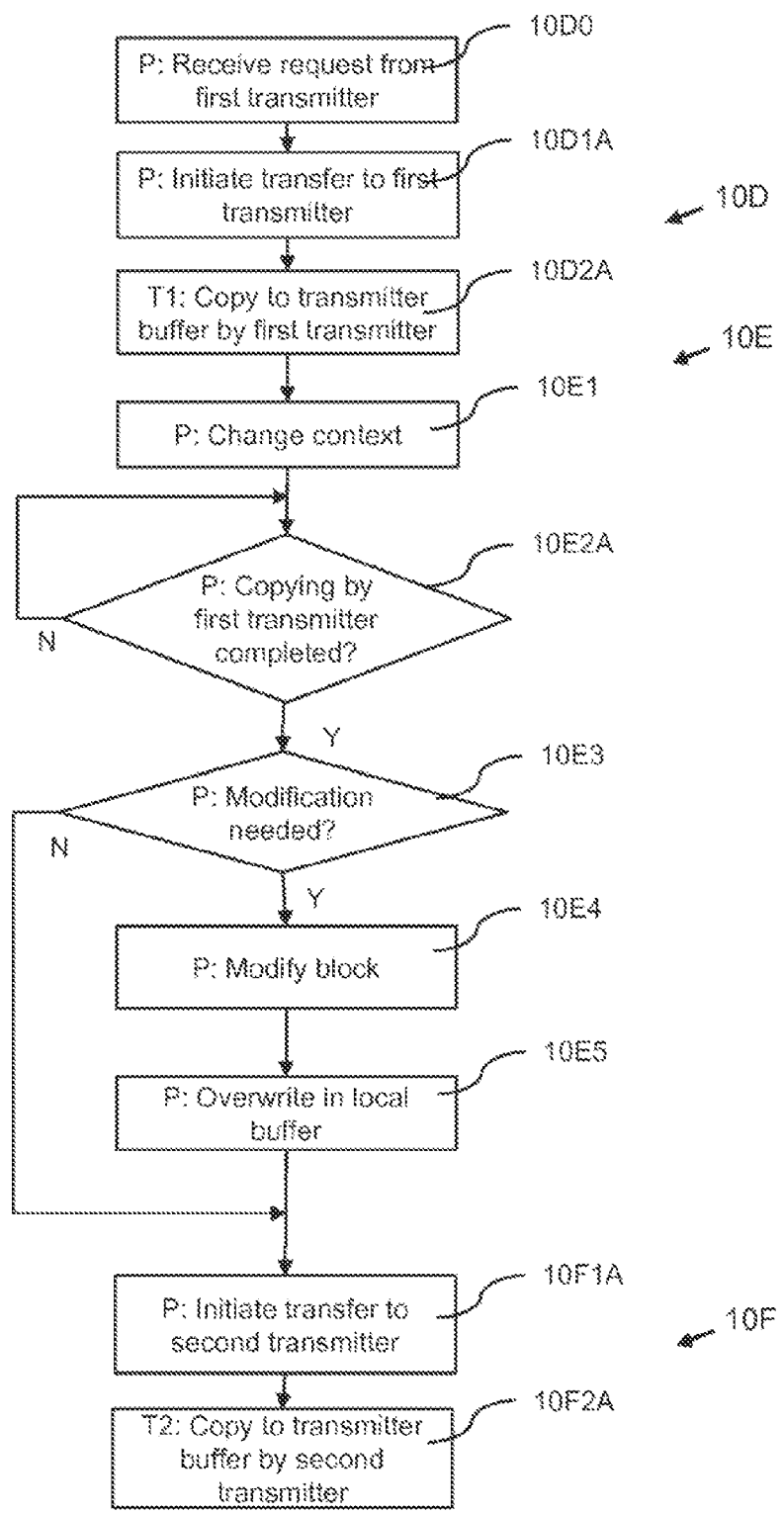
FIG. 9 schematically shows further details of an embodiment of a method.

FIG. 9 schematically shows an alternative embodiment. In the alternative embodiment shown in FIG. 9, the first transmitter of the predefined sequence is arranged to copy the data block from the respective position of the data block in the local buffer to the transmitter buffer of the first transmitter in response to initiation by the processor of the transfer, and the other transmitter(s) of the predefined sequence is/are arranged to copy the data block from the respective position to the transmitter buffer of the respective other transmitter in response to initiation by the processor of the transfer. In FIG. 9, the actions executed by the processor RISC1 are indicated with a "P:" preamble, and actions executed by the first and subsequent transmitters of the predefined sequence are indicated with a "T1" or "T2" preamble respectively. Blocks 10D0, 10E1, 10EA, 10E3, 10E4, 10E5 correspond to the blocks with the same reference signs in FIG. 8. However, in FIG. 9, for initiating and executing 10D transfer after the processor received a request from the first transmitter of the predefined sequence, the processor initiates 10D1A transfer of the data block to the transmitter buffer of the first transmitter and the first transmitter copies 10D2A the data block from the local buffer to its transmitter buffer upon being initiation by the processor. Further, for initiating and executing 10F transfer of the data block to the subsequent transmitter, the processor initiates 10F1A transfer of the data block to the transmitter buffer of the subsequent transmitter and the subsequent transmitter copies 10F2A the data block from the local buffer to its transmitter buffer upon being initiation by the processor.

Figure 10:
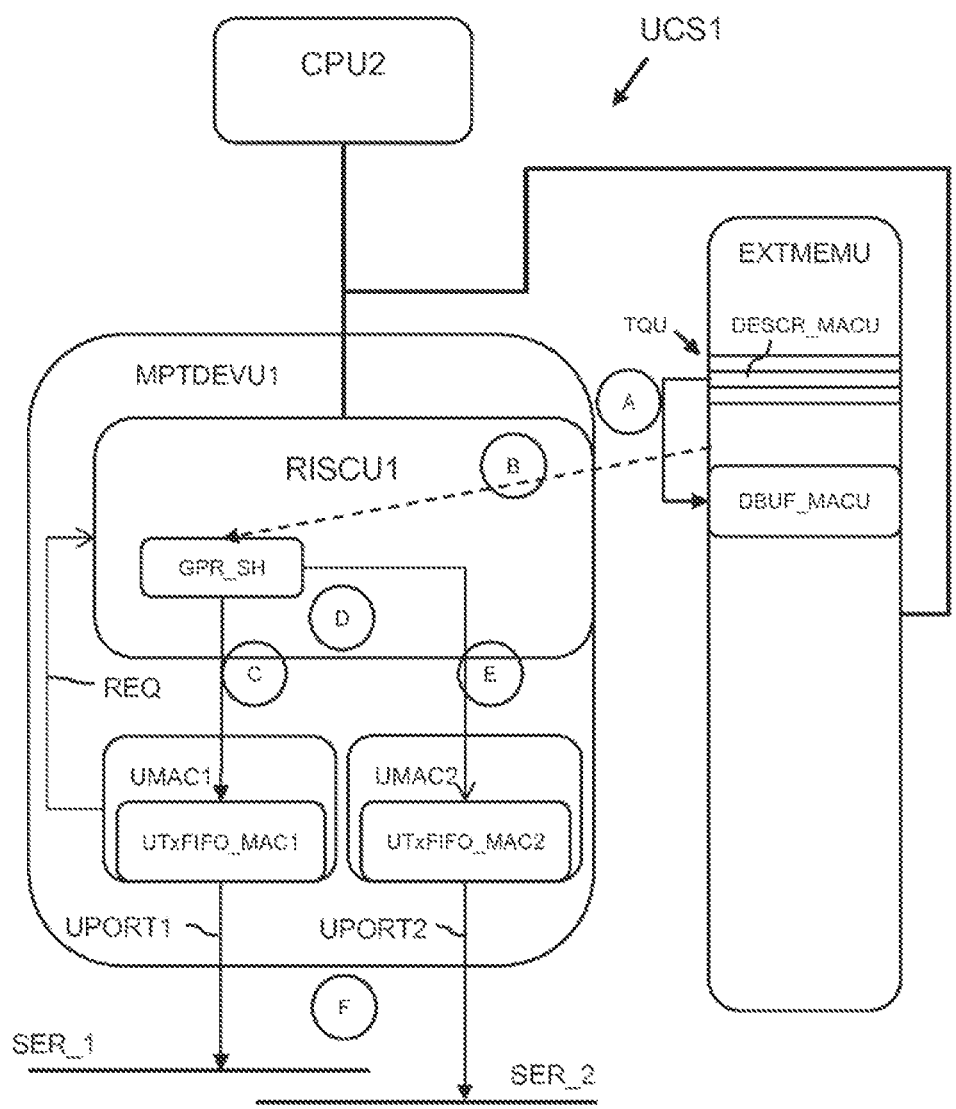
FIG. 10 schematically shows an example of an embodiment of a UART-based multi-port transmitter.
Figure 11:
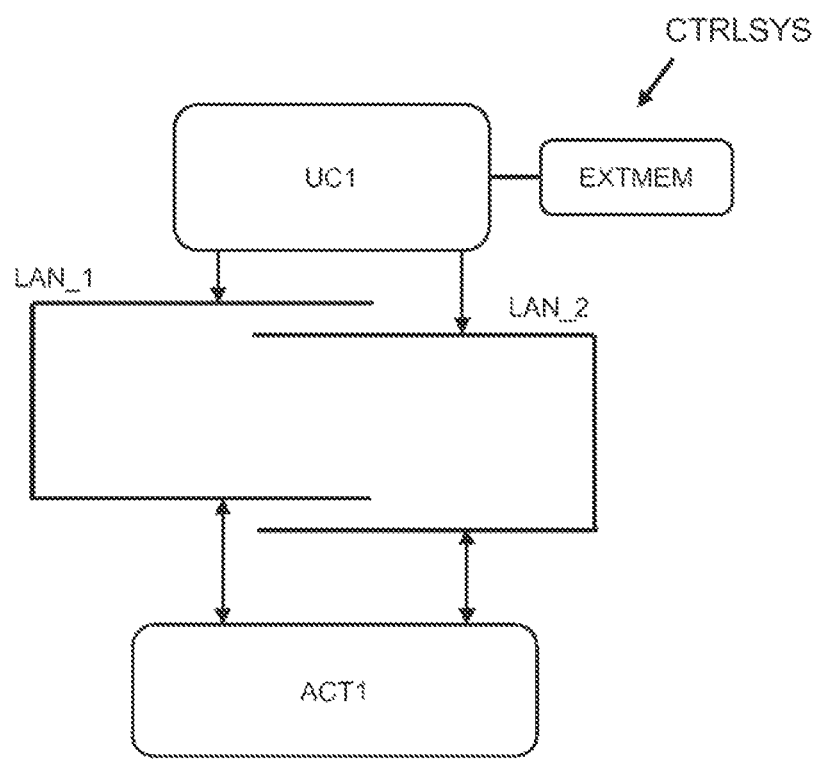
FIG. 11 schematically shows a control system CTRLSYS according to an embodiment.

FIG. 10 shows an embodiment wherein the transmitters comprise serial transmitters UMAC1, UMAC2, arranged to transmit data over two parallel serial networks SER_1, SER2. The serial transmitters may be arranged to use e.g. ProfiBUS or another RS-485 Universal Asynchronous receiver/transmitter (UART)-based serial protocol. Serial networks may be used, for example, in applications with a relatively low data rate.

The example shown in FIG. 10 shows a communications processor UCS1 comprising a central processing unit (CPU) CPU2 and a duplicast transmitter MPTDEVU1 for transmitting redundant data using a RS-485 serial protocol. The duplicast transmitter MPTDEVU1 comprises a processor RISCU1, an array of registers GPR_SH inside the duplicast transmitter MPTDEVU1, a first transmitter UMAC1 and a second transmitter UMAC2 comprising respective transmitter buffers UTxFIFO_MAC1 and UTxFIFO_MAC2 and respective transmitter ports UPORT1 and UPORT2. The transmitter ports UPORT1 and UPORT2 are connected to two different serial networks SER_1 and SER_2. The transmitters UMAC1 and UMAC2 are arranged to transmit data buffered in the transmitter buffers UTxFIFO_MAC1 and UTxFIFO_MAC2 via the transmitter ports UPORT1 and UPORT2. The array of registers GPR_SH may also be referred to as work area or as local buffer. The transmitter buffers UTxFIFO_MAC1, UTxFIFO_MAC2 are implemented as cyclic First-In-First-Out (FIFO) buffers in local random access memory (RAM). In this example, the processor RISCU1 is a reduced instruction set computing (RISC) processor.

The first transmitter UMAC1 is arranged to act as a master transmitter, and arranged to issue a request REQ to the processor to provide a data block when the transmitter buffer UTxFIFO_MAC1 of the master transmitter has free space to store a data block.

The central processing unit CPU2 and the duplicast transmitter MPTDEVU1 are connected to an external memory EXTMEMU. The external memory EXTMEMU may be a DDR memory. The external memory EXTMEMU is used to store the data to be transmitted via each of the transmitters in a data buffer DBUF_MACU in the external memory EXTMEMU.

The architecture of the example shown in FIG. 10 is largely similar to the architecture of the embodiment shown in FIG. 4. For subsystems, components and actions that are substantially similar or substantially the same as described with FIG. 4, reference is therefore made to the description above. Further and/or alternative embodiments may be envisaged with corresponding further and/or alternative features as in embodiments described with reference to FIG. 4.

Figure 3:
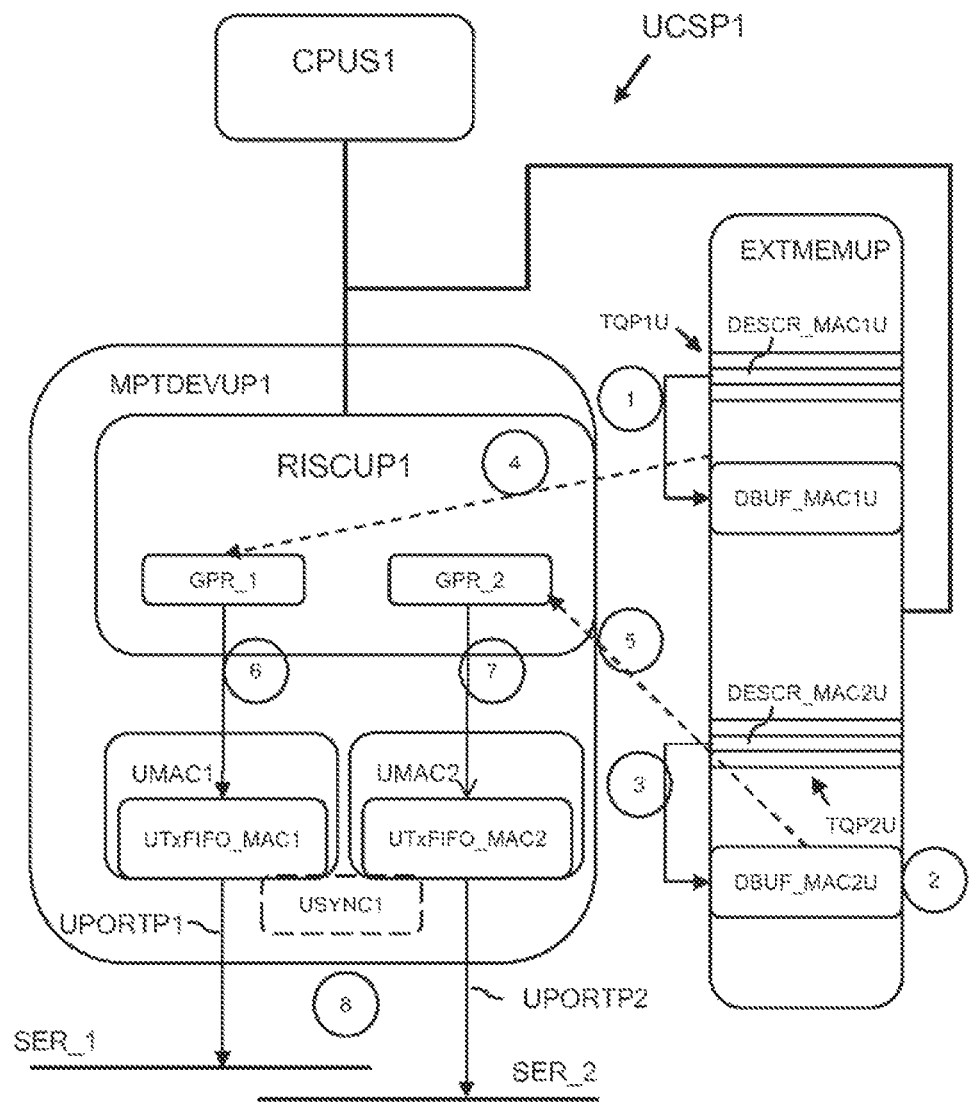
FIG. 3 schematically shows a prior art example of a communications processor having an UART-based multi-port transmitter.

The embodiment shown in FIG. 10 differs from the Ethernet embodiment shown in FIG. 3 in that the local buffer does not comprise a FIFO WA_FIFOSH capable to store one or more frames (in data blocks), but an array of registers GPR_SH. Consequently, in action B, the processor RISCU1 reads the first descriptor DESCR_MAC1 from transmission queue TQU, reads the frame from the data buffer DBUF_MACU in dependence on the descriptor DESCR_MACU via a direct memory access (DMA), and stores the frame in data blocks of appropriate sizes at positions in array of registers GPR_SH. The other actions A and C-F are similar as described with reference to FIG. 4, with the arrays of registers substantially taking the places of the FIFOs WA_MAC1, WA_MAC2, and while storing only a single frame at a time in the local buffer, GPR_SH.

Thus, an embodiment of the method illustrated in FIG. 8 may be performed by the system shown in FIG. 10 as follows. The descriptors in the transmission queue TQU may be arranged in a cyclic ring FIFO. The CPU CPU2 may prepare the descriptors, write the descriptors into the transmission queue TQU and wrap back to the beginning of the ring when at the end of the cyclic ring FIFO. Both the CPU CPU2 and the processor RISCU1 may maintain respectively a CPU pointer and a RISC pointer to cyclic ring FIFO, i.e., to the transmission queue TQU. The CPU pointer may effectively be a write pointer and the RISC pointer may effectively be a read pointer.

The transmitter UMAC1 may inform the processor RISCU1 that it has fee space in its transmitter buffer UTxFIFO_MAC1 for one byte, for example by a request message REQ over a request line to the processor. The processor RISCU1 polls a descriptor DESCR_MACU at the position in the transmission queue indicated by a descriptor pointer and, if the control and status field DSTATCTRL of the descriptor DESCR_MACU indicates that data is available (i.e., has been written by the CPU CPU2) at the position indicated by the descriptor DESCR_MACU, copies the data from the external memory EXTMEMU to the array of registers GPR_SH using the pointer DPNT and size DLEN (refer to FIG. 1b). Hereto, the processor RISCU1 may issue a DMA read to get either all of the data indicated by the descriptor or some of the data, depending on the size of the data and the size of the array of register GPR_SH. For example, for a UART-based embodiment, the transmitter may be arranged transmit data one byte at a time, while the DMA size may be bigger, such as 8 bytes at a time for an improved efficiency in accessing the external memory EXTMEMU. While waiting for these 8 bytes to be read via DMA from the external memory EXTMEMU to a temporary location within a local RAM of the processor RISCU1, software on the processor RISC may perform a task switch allowing other transmitters, receivers or threads to be handled. After the DMA completes and the processor RISCU1 finishes its current task, and potentially other pending tasks, the processor RISCU1 may return to the first transmitter and read the first byte to be transmitted into an array of registers GPR_SH. The processor RISCU1 may further also program an accompanying array of registers or additional registers of the array of registers GPR_SH with any commands and/or metadata needed by the transmitter UMAC1. The processor RISCU1 may then initiate and execute transfer to the first transmitter buffer by writing the data stored in the array of registers GPR_SH and the command and/or metadata to the first transmitter buffer UTxFIFO_MAC1 as will be described in more detail below. Subsequently, the processor RISCU1 changes context to serve another transmitter, and may flip any bit/bits required by the protocol and initiate and execute transfer to the another transmitter, and continues in this manner until all transmitters have been serviced in a predefined sequence. The processor RISCU1 may further perform any other functionality needed by the protocol, e.g. FCS calculation, whether that be from requirements in a specification for the physical layer or an intradevice or system protocol used in communication between the array of registers GPR_SH and the transmitter buffers UTxFIFO_MAC1, UTxFIFO_MAC2.

The first transmitter UMAC1 is arranged to process the command and/or metadata and applies any formatting needed by the protocol at the physical layer. For this UART-based example, the first transmitter UMAC1 may add framing information needed to the UART character such as a start bit, a stop bit and parity if required. The first transmitter UMAC1 may also issue another request if it has space in its transmitter buffer UTxFIFO_MAC1 for another one byte. The processor RISCU1 may then service this transmitter, read the next byte and send as before to the first transmitter buffer UTxFIFO_MAC1 and so on until it reaches the last byte of the first DMA's worth of data. The processor RISCU1 may further check if there are more bytes still to be provided to the first transmitter UMAC1 and, if so, the processor RISCU1 may read in the next 8 bytes or however many are needed to provide via DMA. After DMA completes, the processor RISCU1 provides the data one byte at a time to the first transmitter buffer UTxFIFO_MAC1 as before. When the last byte of the frame is reached, the processor RISCU1 may signal in the metadata that this byte is the last byte, allowing the first transmitter UMAC1 to send an idle character to terminate the frame, if so governed by the protocol at the physical layer. Subsequently, the processor RISCU1 changes context to the second transmitter UMAC2 and provides data to the second transmitter buffer UTxFIFO_MAC2 from the same array of registers GPR_SH, if required after having modified the data.

After all transmitters have been serviced, the processor RISCU1 closes the descriptor DESCR_MACU by modifying the descriptor to indicate that the associated data was completely read. The CPU CPU2 may then react to this change of the descriptor DESCR_MACU and, for example, reprogram the transmit queue TQU with a next descriptor pointing to new data in the external memory EXTMEMU.

Thus, a plesiochronous transmission by the two transmitters UMAC1, UMAC2 may be obtained, wherein the transmitter buffers UTxFIFO_MAC1 and UTxFIFO_MAC2 are fed from a single array of registers GPR_SH and only one access to each frame in the external memory EXTMEMU may be needed to load the array of registers, i.e., to load the local buffer with data blocks.

For similar reasons as described with reference to FIG. 4, improved performance in transmission of two identical or plesio-identical frames may arise. For example, data is only copied once from external memory EXTMEMU, which may result in more tightly coupled deterministic latency and jitter between the transmissions by the two transmitters UMAC1, UMAC2 over the two ports UPORT1, UPORT2.

Similarly as described with reference to FIG. 8, the processor RISCU1 may be arranged to sequentially initiate as well as execute transfer of the data block from the local buffer as provided by the array of registers GPR_SH to the transmitter buffers. Similarly as described with reference to FIG. 8 and FIG. 9, in alternative embodiments, the processor RISUC1 may be arranged to sequentially initiate transfer of the block from the local buffer to the transmitter buffers while the transmitters are arranged to execute the transfer by, in response to initiation by the processor, reading the data block from the local buffer and copying the data block to the transmitter buffers.

The embodiments described above with reference to FIG. 4 as well as the embodiments described with reference to FIG. 10 thus provide a method of transmitting at least partly redundant, data, e.g., as.identical, plesio-identical or quasi-identical frames. The method comprises, storing A data and optionally a data descriptor in an external memory, for example by a CPU CPU1 or CPU CPU2. The method comprises, for example by processor RISC1 or processor RISCU1, reading B at least one data block of the data stored in the external memory, and optionally the data descriptor, from the external memory, and storing the at least one data block at respective data block positions in a local buffer WA_FIFOSH or GPR_SH. The method comprises, by the master transmitter, issuing a request to the processor to provide a data block when a transmitter buffer, such as TxFIFO_MAC1 or UTxFIFO_MAC1, of the master transmitter has free space to store a data block. The method comprises, by the processor, for each data block of the at least one data block stored at the respective positions in the local buffer sequentially initiating transfer (C, E) of the data block from the respective position of the data block in the local buffer (WA_FIFOSH; GPR_SH) to the transmitter buffer (TxFIFO_MAC1; UTxFIFO_MAC1) of the master transmitter and to the transmitter buffers (TxFIFO_MAC2; UTxFIFO_MAC2) of at least one further transmitter of the at least two transmitters (EMAC1, EMAC2; UMAC1, UMAC2) in response to a request from the master transmitter to provide a data block. The sequentially initiating transfer is performed in accordance with a predefined sequence of transmitters, the predefined sequence starting at a first transmitter selected from the master transmitter and the at least one further transmitter and continuing with a subsequent transmitter. Hereby, plesiochronous transmission may be achieved F.

The master transmitter may be the first transmitter of the predefined sequence. In an alternative embodiment, one of the at least one further transmitters is the first transmitter of the predefined sequence.

The method may comprise, for one or more data blocks of the at least one data blocks, initiating transfer of the data block from the respective position in the local buffer to the subsequent transmitter only after initiating transfer of the data block to the first transmitter.

The method may comprise, for one or more data blocks of the at least one data blocks, initiating transfer of the data block from the respective position in the local buffer to the subsequent transmitter only after completing transfer of the data block to the first transmitter.

The method may hereto, for example, further comprise determining whether the first transmitter completed receiving of the data block, and, only after having determined that the first transmitter completed the receiving of the data block, initiate transfer of the data block to the subsequent transmitter.

The method may further comprise, for at least one data block of the one or more data blocks, in between initiating transfer of the data block to the first transmitter and initiating transfer of the data block to the subsequent transmitter, modifying D the formatted data block from having a first content into having a second content, and storing the data block having the second content in the respective position in the local buffer where the data block having the first content was stored.

The method may further comprise, for other data blocks than the at least one data blocks that are modified, initiating transfer of the other data block to the subsequent transmitter without waiting for the first transmitter to have completed the receiving of the other data block.

In an embodiment, the sequentially initiating of the transfer is performed by the processor, and the method comprises, by the first transmitter, copying the data block from the respective position of the data block in the local buffer (WA_FIFOSH; GPR_SH) to the transmitter buffer (TxFIFO_MAC1; UTxFIFO_MAC1) of the first in response to initiation by the processor of the transfer, and, by the other transmitters of the predefined sequence, copying the data block from the respective position to the transmitter buffer (TxFIFO_MAC2; UTxFIFO_MAC2) of the respective other transmitter in response to initiation by the processor of the respective transfer.

In an alternative embodiment, the sequentially initiating of the transfer is performed by the processor, and the method comprises, by the processor, upon initiating the transfer to the transmitter buffer of the first transmitter of the predefined sequence, executing the transfer by copying the data block from the respective position of the data block in the local buffer to the transmitter buffer of the first transmitter, and, by the processor, for each other transmitter of the predefined sequence, upon initiating the transfer to the transmitter buffer of the other transmitter, executing the transfer by copying the data block from the respective position of the data block in the local buffer to the transmitter buffer of the other transmitter.

In an embodiment, the multi-port transmitter device is usable in an automation system using ProfiBUS and thereto be capable of transmitting identical data via two parallel RS-485 UART-based transmitters.

In another embodiment, the multi-port transmitter device may be usable in an automation system using an Ethernet-based fieldbus system, such as EtherCAT, and capable of transmitting plesio-identical data via two parallel Ethernet transmitters to two LANs. Herein, the term plesio-identical data may relate to data that is identical as to its information content (sometimes referred to as user data) but different as to a few bits of control data associated with the physical layer or data link layer protocol (sometimes referred to as Layer 1 and Layer 2 respectively, following the terminology of the generally used OSI reference model) used for operating the LANs, such as a LAN-identifier.

In again another example, the multi-port transmitter device may be usable in an automation system using an Ethernet-based system using a data link or physical layer protocol with quasi-identical layer-2 data over two redundant LANs. Herein, the term quasi-identical may relate to data that is identical as to its information content (also referred to as user data), but different in a plurality of fields in headers and/or trailers of a frame or data unit in Layers 1-7 of the OSI model, or wherein differing control bits are scattered over the frame.

FIG. 10 schematically shows a control system CTRLSYS comprising a communications processor UC1, a memory device EXTMEM and at least two control lines (illustrated as two local area networks LAN_1, LAN_2). The communications processor UC1 comprises a control processor CPU and a multi-port transmitter MPTDEV1 device according to any one embodiment. The multi-port transmitter MPTDEV1 device comprises at least two transmitters having respective transmitter ports. The transmitter ports are connected to respective control lines of the at least two control lines LAN_1, LAN_2. The memory device is arranged to act as external memory for the multi-port transmitter device for storing data to be transmitted. The control processor is arranged to store the data to be transmitted in the memory device EXTMEM and to operate the multi-port transmitter device MPTDEV1 to provide at least partly redundant signals via the two transmitters to the at least two control lines LAN_1, LAN_2 to control an actuator device ACT1 connected to the at least two control lines to receive the redundant signals.

Figure 12:
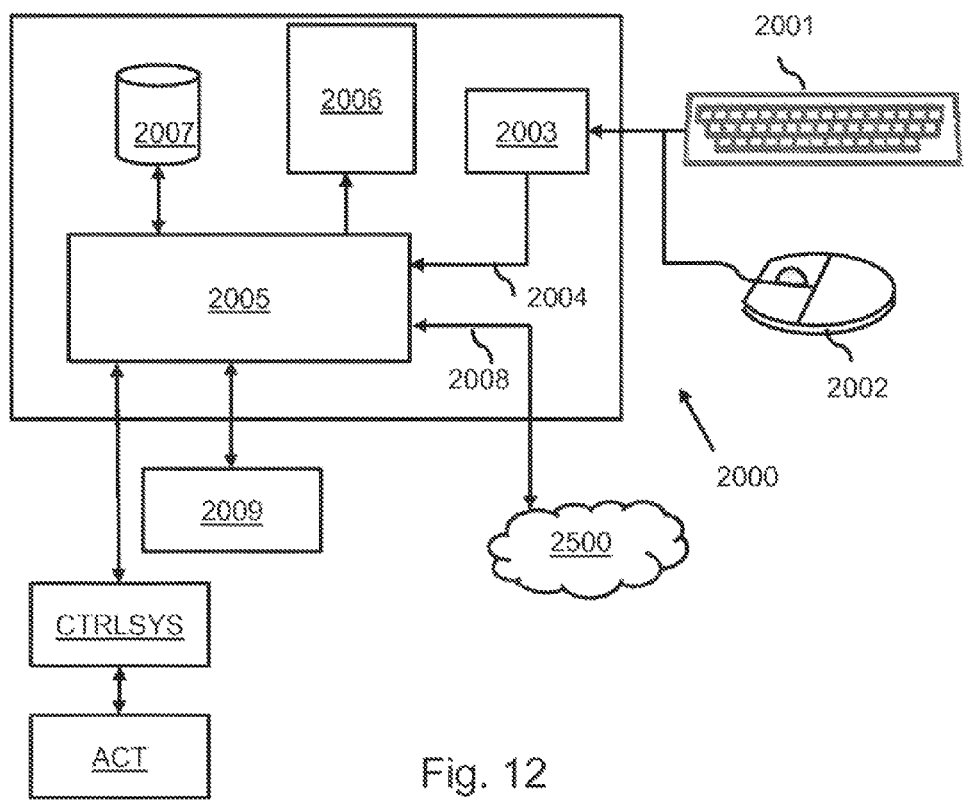
FIG. 12 schematically shows an exemplary user interaction system.

FIG. 12 schematically shows an exemplary user interaction system 2000 for operating an actuator ACT via a control system CTRLSYS according to an embodiment. The user interaction system 2000 has a programmable processor 2005. The user interaction system 2000 is shown to be a personal computer, but may be any type of suitable user interaction system 2000. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as data to be to be transmitted via the control system CTRLSYS to the actuator ACT for operating the actuator ACT. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow operating the actuator ACT by a user. The processor 2005 may also be arranged to generate a report. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the multi-port transmitter device of the control system CTRLSYS to perform a method of transmitting at least partly redundant data according to any one of the embodiments described above, and to program the multi-port transmitter device of the control system CTRLSYS (e.g., the CPU CPU2 and the multi-port transmitter MPTDEV1) to perform the method.

Figure 13:
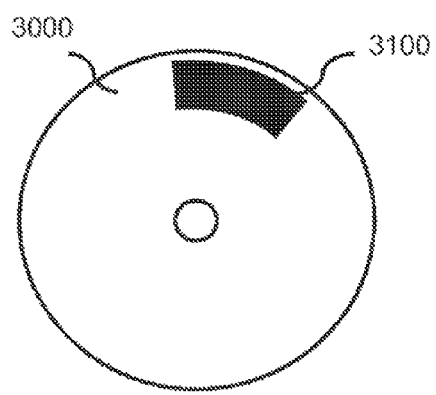
FIG. 13 shows a computer readable medium comprising a computer program product.

FIG. 13 shows a computer readable medium 3000 comprising a computer program product 3100, the computer program product 3100 comprising instructions for causing a multi-port transmitter device according to an embodiment to perform a method of transmitting at least partly redundant data according to any one of the embodiments described above. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 13 as an optical disc, the computer readable medium 3000 may be any suitable computer readable medium, such as a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system or a programmable device, such as a CPU or a RSIC processor. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 4 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of communications processors UC1 and UCS1 are circuitry located on a single integrated circuit or within a same device. Alternatively, communications processors UC1 and UCS1 may include any number of separate integrated circuits or separate devices interconnected with each other. Also for example, CPU CPU1, CPU CPU2, processor RISC1, processor RISCU1 or portions thereof may be soft or code representations of physical circuitry or of logical representations convertible into physical circuitry. As such, CPU CPU1, CPU CPU2, processor RISC1, processor RISCU1 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. For example, processor RISC1 may be an integral part of CPU CPU1, or a separate block inside communications processor UC1.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A multi-port transmitter device for transmitting at least partly redundant data, the multi-port transmitter device comprising:
   at least two transmitters, wherein:
      the transmitters comprise respective transmitter buffers and respective transmitter ports,
      the transmitters being arranged to transmit data buffered in the transmitter buffers via the transmitter ports,
      one transmitter of the at least two transmitters being a master transmitter further arranged to issue a request to a processor to provide a data block when the transmitter buffer of the master transmitter has free space to store a data block; and the processor, coupled to the transmitters, and arranged to:
read at least one data block of data stored in an external memory from the external memory, and
store the at least one data block at respective positions in a local buffer,
for each data block of the at least one data block stored at the respective positions in the local buffer:
sequentially initiate transfer of the data block from the respective position of the data block in the local buffer to the transmitter buffer of the master transmitter and to the transmitter buffers of at least one further transmitter of the at least two transmitters in response to a request from the master transmitter to provide a data block,
sequentially initiate transfer in accordance with a predefined sequence of transmitters, the predefined sequence starting at a first transmitter selected from the master transmitter and the at least one further transmitter and continuing with a subsequent transmitter.

2. A multi-port transmitter device according claim 1, wherein the master transmitter is the first transmitter of the predefined sequence.

3. A multi-port transmitter device according to claim 1, wherein one of the at least one further transmitters is the first transmitter of the predefined sequence.

4. A multi-port transmitter device according to claim 1, wherein the transmitters of the predefined sequence being arranged to inform the processor of completing receiving of the data block and the processor being arranged to, for one or more data blocks of the at least one data blocks, after having initiated transfer to the first transmitter of the predefined sequence:
determine whether the first transmitter completed the receiving of the data block, and
only after having determined that the first transmitter completed the receiving of the data block, initiate transfer of the data block to the subsequent transmitter of the predefined sequence.

5. A multi-port transmitter device according to claim 4, the processor being arranged to, for at least one data block of the one or more data blocks, in between initiating transfer of the data block to the transmitter buffer of the first transmitter and initiating transfer of the data block to the transmitter buffer of the subsequent transmitter:
modify the data block from having a first content into having a second content.

6. A multi-port transmitter device according to claim 5, the processor being arranged to, after having modified the data block from having the first content into having the second content:
store the data block having the second content in the respective position in the local buffer where the data block having the first content was stored.

7. A multi-port transmitter device according to claim 5, the processor being arranged to:
for each data block, determine whether a modification of the data block needs to be performed in between initiating transfer of the data block to the first transmitter of the predefined sequence and initiating transfer of the data block to the subsequent transmitter of the predefined sequence, if no modification needs to be performed:
initiate transfer of the data block to the subsequent transmitter after initiating transfer of the data block to the first transmitter,
if modification needs to be performed:
modify the data block from having a first content into having a second content in between initiating transfer of the data block to the first transmitter and initiating transfer of the data block to the second transmitter,
only after transfer of the data block to the first transmitter is completed:
store the data block having the second content in the respective position in the local buffer where the data block having the first content was stored, and
initiate transfer of the data block having the second content to the subsequent transmitter.

8. A multi-port transmitter device according to claim 1, the processor being arranged to read the at least one data block of data stored in the external memory in dependence of a descriptor, the descriptor comprising at least a length and a position in the external memory of a frame comprising the at least one data block.

9. A multi-port transmitter device according to claim 1, the local buffer comprising an array of registers inside the processor.

10. A multi-port transmitter device according to claim 1, the local buffer comprising a FIFO.

11. A multi-port transmitter device according to claim 1, the transmitter buffers comprising respective transmitter FIFOs.

12. A multi-port transmitter device according to claim 1, the at least two transmitters comprising at least two Ethernet transmitters and/or at least two serial transmitters.

13. A multi-port transmitter device according to claim 1, the processor being operable with a software routine switchable between at least two contexts, each context being associated with servicing a respective transmitter, the servicing comprising initiating transfer of the data block to the transmitter buffer of the respective transmitter.

14. A method of transmitting at least partly redundant data using a multi-port transmitter device according to claim 1, the method comprising:
storing data in an external memory,
reading at least one data block of the data stored in the external memory from the external memory, and storing the at least one data block at respective data block positions in a local buffer;
by a master transmitter, issuing a request to a processor to provide a data block when a transmitter buffer of the master transmitter has free space to store a data block;
by the processor, for each data block of the at least one data block stored at the respective positions in the local buffer:
sequentially initiating transfer of the data block from the respective position of the data block in the local buffer to the transmitter buffer of the master transmitter and to the transmitter buffers of at least one further transmitter of the at least two transmitters in response to a request from the master transmitter to provide a data block, and
the sequentially initiating transfer being performed in accordance with a predefined sequence of transmitters, the predefined sequence starting at a first transmitter selected from the master transmitter and the at least one further transmitter and continuing with a subsequent transmitter.

15. A method according to claim 14, the method further comprising, for one or more data blocks of the at least one data blocks:

determining whether the first transmitter of the predefined sequence completed the receiving of the data block; and, only after having determined that the first transmitter completed the receiving of the data block, initiating transfer of the data block to the subsequent transmitter of the predefined sequence.

16. A method according to claim 14, the at least one further transmitter comprising a second transmitter, the method further comprising:

for at least one data block of the one or more data blocks, in between initiating transfer of the data block to the first transmitter and initiating transfer of the data block to the subsequent transmitter, one or more of:

modifying the formatted data block from having a first content into having a second content; and storing the data block having the second content in the respective position in the local buffer where the data block having the first content was stored.

17. A method according to claim 14, wherein the sequentially initiating of the transfer is performed by a processor, and the method comprises:

by the first transmitter: copying the data block from the respective position of the data block in the local buffer to the transmitter buffer of the first in response to initiation by the processor of the transfer, and by the other transmitters of the predefined sequence: copying the data block from the respective position to the transmitter buffer of the respective other transmitter in response to initiation by the processor of the respective transfer.

* * * * *